(12) United States Patent
Song

(10) Patent No.: US 12,301,391 B2
(45) Date of Patent: May 13, 2025

(54) NEAR-FIELD COMMUNICATION RECEIVER AND OPERATING METHOD THEREOF

(71) Applicant: Samsung Electronics Co., Ltd., Suwon-si (KR)

(72) Inventor: Yunseob Song, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 453 days.

(21) Appl. No.: 17/729,507

(22) Filed: Apr. 26, 2022

(65) Prior Publication Data

US 2022/0353117 A1 Nov. 3, 2022

(30) Foreign Application Priority Data

Apr. 27, 2021 (KR) .................. 10-2021-0054634

(51) Int. Cl.
*H04B 5/00* (2024.01)
*H04B 1/16* (2006.01)
*H04B 5/72* (2024.01)
*H04L 25/06* (2006.01)
*H04L 27/00* (2006.01)
*H04L 27/06* (2006.01)
*H04W 4/80* (2018.01)

(52) U.S. Cl.
CPC .............. *H04L 27/06* (2013.01); *H04B 5/72* (2024.01)

(58) Field of Classification Search
None
See application file for complete search history.

(56) References Cited

U.S. PATENT DOCUMENTS

| 7,532,682 B1 * | 5/2009 | Schell ..................... H03C 5/00 |
| | | 375/256 |
| 7,580,683 B2 | 8/2009 | Gardenfors et al. |
| 7,714,760 B2 | 5/2010 | Petrovic |
| 7,953,182 B2 * | 5/2011 | Schell ..................... H03C 5/00 |
| | | 375/256 |

(Continued)

FOREIGN PATENT DOCUMENTS

| JP | 2012109647 A | 6/2012 |
| JP | 2018509665 A | 4/2018 |

OTHER PUBLICATIONS

Korean Office Action issued Mar. 25, 2025 in Korean Patent Application No. 10-2021-0054634.

*Primary Examiner* — Tuan A Tran
(74) *Attorney, Agent, or Firm* — Harness, Dickey & Pierce, P.L.C.

(57) ABSTRACT

Provided is a near-field communication (NFC) receiver. The NFC receiver includes at least one antenna configured to receive an amplitude modulation (AM) signal, a first analog-to-digital converter (ADC) configured to generate an in-phase (I)-sample by sampling the AM signal based on a first clock signal, a second ADC configured to generate a quadrature-phase (Q)-sample by sampling the AM signal based on a second clock signal, the second clock signal having a phase difference of 90° from the first clock signal, and processing circuitry configured to calculate a root-sum-square (RSS) value between the I-sample and the Q-sample, and detect an envelope of the AM signal by using the RSS value.

20 Claims, 14 Drawing Sheets

(56) References Cited

U.S. PATENT DOCUMENTS

| | | | |
|---|---|---|---|
| 8,188,787 B2* | 5/2012 | Wilson | H03D 1/18 |
| | | | 329/347 |
| 8,249,535 B2* | 8/2012 | Ridgers | H04B 1/16 |
| | | | 375/322 |
| 8,374,571 B2 | 2/2013 | Motozawa et al. | |
| 8,606,212 B2* | 12/2013 | Sheikholeslami | H04B 5/72 |
| | | | 375/326 |
| 9,008,229 B2* | 4/2015 | Li | G04R 20/10 |
| | | | 455/108 |
| 9,036,758 B2* | 5/2015 | Yoon | G10L 25/00 |
| | | | 375/228 |
| 9,130,603 B2* | 9/2015 | Gopalan | H04B 5/24 |
| 9,191,254 B2* | 11/2015 | Yoon | G01B 9/0209 |
| 9,520,987 B2* | 12/2016 | Kang | H04L 25/49 |
| 9,648,444 B2* | 5/2017 | Agee | H04W 4/70 |
| 9,712,317 B2* | 7/2017 | Frantzeskakis | H04L 27/0014 |
| 9,819,480 B2* | 11/2017 | Nekhamkin | H04W 56/005 |
| 9,996,786 B1 | 6/2018 | Mendel et al. | |
| 10,187,100 B2* | 1/2019 | Wicaksana | H04L 25/061 |
| 10,198,727 B1* | 2/2019 | Rezayee | H04L 27/12 |
| 10,491,437 B2 | 11/2019 | Cao et al. | |
| 10,735,038 B2 | 8/2020 | Srinivasan et al. | |
| 10,944,617 B2* | 3/2021 | de Ruijter | H04L 27/3863 |
| 11,031,962 B2* | 6/2021 | Oh | H03L 7/08 |
| 11,671,147 B2* | 6/2023 | Kang | H04B 5/72 |
| | | | 455/41.1 |
| 12,119,891 B2* | 10/2024 | Kang | H04B 5/45 |
| 2007/0140382 A1 | 6/2007 | Qian | |
| 2009/0290660 A1* | 11/2009 | Neugebauer | H04B 1/7075 |
| | | | 375/340 |
| 2014/0266611 A1* | 9/2014 | Breitfuss | G06K 7/10386 |
| | | | 340/10.1 |
| 2019/0086517 A1 | 3/2019 | Puglia et al. | |
| 2020/0103473 A1 | 4/2020 | Guo et al. | |
| 2020/0235968 A1* | 7/2020 | Luzzi | H04B 5/266 |

\* cited by examiner

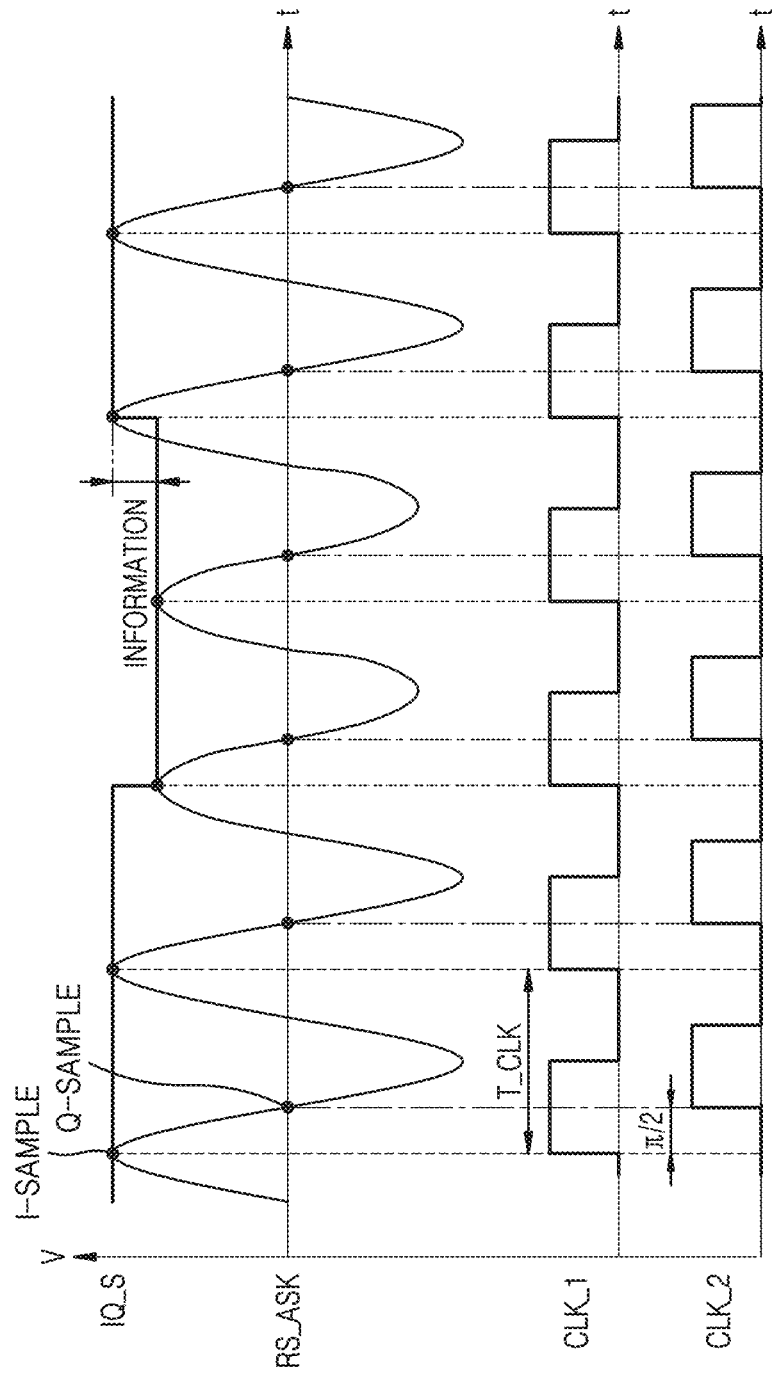

NEAR-FIELD COMMUNICATION RECEIVER AND OPERATING METHOD THEREOF

CROSS-REFERENCE TO RELATED APPLICATION

This application is based on and claims priority under 35 U.S.C. § 119 to Korean Patent Application No. 10-2021-0054634, filed on Apr. 27, 2021, in the Korean Intellectual Property Office, the disclosure of which is incorporated by reference herein in its entirety.

BACKGROUND

The inventive concepts relate to near-field communication (NFC), and more particularly, to an NFC receiver including an IQ demodulator.

NFC is a wireless communication technology. A wireless communication system to which NFC is applied may use both data writing and reading functions. The implementation cost of NFC systems is low because of a relatively short communication distance, and relatively high security is ensured because the radio frequency (RF) signal format and modulation for NFC systems are developed to ensure reliable communication without consuming too much power.

NFC-enabled devices communicate by modulating the amplitude of a communication signal, and an NFC receiver included in a wireless communication system to which NFC is applied recovers a frequency, a phase, etc. of a received amplitude-shift keying (ASK) signal to reconstruct the received ASK signal. In this case, a clock extractor may be used, and a phase of a local oscillator is synchronized with a phase of a carrier wave and a peak value of the ASK signal is detected. In this case, because a plurality of analog circuits are used to design the NFC receiver for synchronous reception, it is difficult to design the NFC receiver or manage the designed NFC receiver.

An NFC transmitter transmits information to be sent in an amplitude of the carrier wave, and various methods are used to increase the amplitude of the received carrier wave in order to improve the reception performance of the NFC receiver.

SUMMARY

The inventive concepts provide a near-field communication (NFC) receiver having a minimized or reduced number of analog circuits while improving the reception performance of the NFC receiver.

According to an aspect of the inventive concepts, there is provided a near-field communication (NFC) receiver including at least one antenna configured to receive an amplitude modulation (AM) signal, a first analog-to-digital converter (ADC) configured to generate an in-phase (I)-sample by sampling the AM signal based on a first clock signal, a second ADC configured to generate a quadrature-phase (Q)-sample by sampling the AM signal based on a second clock signal, the second clock signal having a phase difference of 90° from the first clock signal, and processing circuitry configured to calculate a root-sum-square (RSS) value between the I-sample and the Q-sample, and detect an envelope of the AM signal by using the RSS value.

According to an aspect of the inventive concepts, there is provided a near-field communication (NFC) receiver including a first analog-to-digital converter (ADC), a second ADC, each of the first ADC and the second ADC having a signal output capability of a first maximum value, and processing circuitry configured to receive an amplitude modulation (AM) signal having a second maximum value greater than the first maximum value, and detect an envelope equal to or less than the first maximum value from the AM signal by using the first ADC and the second ADC, wherein the first ADC is configured to sample the AM signal based on a first clock signal, the first clock signal being shifted from a reference clock signal by a first phase, and the second ADC is configured to sample the AM signal based on a second clock signal, the second clock signal being shifted from the reference clock signal by a second phase.

According to an aspect of the inventive concepts, there is provided a near-field communication (NFC) receiver including an antenna configured to receive an amplitude modulation (AM) signal, processing circuitry configured to generate a first clock signal and a second clock signal based on a reference clock signal, the first clock signal and the second clock signal having a phase difference of 90°, and a first analog-to-digital converter (ADC) and a second ADC configured to generate two quadrature phase samples of the AM signal by directly sampling the AM signal according to the first clock signal and the second clock signal, wherein the processing circuitry is configured to calculate a magnitude value of the two quadrature phase samples.

BRIEF DESCRIPTION OF THE DRAWINGS

Embodiments of the inventive concepts will be more clearly understood from the following detailed description taken in conjunction with the accompanying drawings in which:

FIGS. 5A and 5B are timing diagrams illustrating internal signals of the NFC receiver of FIG. 4;

DETAILED DESCRIPTION

Hereinafter, embodiments of the inventive concepts will be described in detail with reference to the accompanying drawings.

Figure 1:
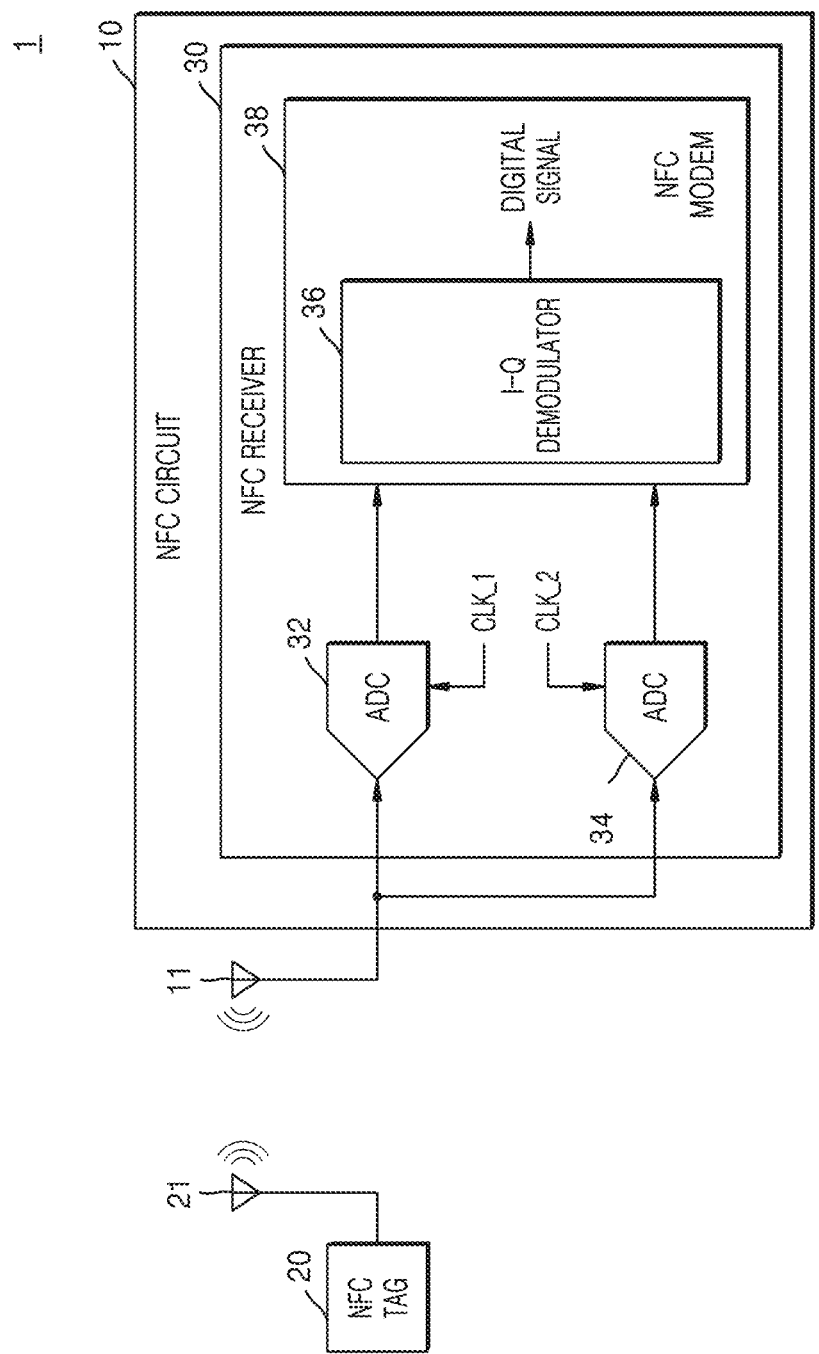
FIG. 1 is a block diagram illustrating a near-field communication (NFC) system including an NFC receiver, according to embodiments of the inventive concepts.

FIG. 1 is a block diagram illustrating a near-field communication (NFC) system including an NFC receiver, according to embodiments of the inventive concepts;

Referring to FIGS. 1 and 2, an NFC system 1 that may support NFC may include an NFC circuit 10 and an NFC tag 20. For example, the NFC tag 20 may be an NFC device including an NFC circuit having the same structure as, or a similar structure to, that of the NFC circuit 10. The NFC circuit 10 may constitute an NFC chip, and the NFC chip may be embedded in an electronic device that may support NFC.

The NFC system 1 may be implemented as a security system, a payment system, a transportation system, a reservation and ticketing system, a building access system, an electronic device access system, etc. The NFC circuit 10 and the NFC tag 20 may use a radio frequency (RF) signal to transmit and/or receive data to and/or from each other. That is, in the NFC system 1, wireless communication of information such as one or more commands and/or data may be provided between the NFC circuit 10 and the NFC tag 20 that are sufficiently close to each other. In this case, when the NFC tag 20 is located in a communication range of the NFC circuit 10, it may be determined that the NFC circuit 10 is close (or proximate).

The NFC circuit 10 may be implemented as a part of a wireless communication device or a portable electronic device. The portable electronic device may be a laptop computer, a mobile terminal, a smart phone, a tablet personal computer (PC), a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), an e-book, etc.

The NFC circuit 10 and the NFC tag 20 may be each implemented as an independent or individual device. However, the NFC circuit 10 and the NFC tag 20 are not limited thereto, and may be mounted in or coupled to another electronic device such as a smartphone, a portable calculator, a PDA, a laptop, a desktop computer, a computer peripheral device such as a printer, a portable audio or video player, a payment system, a ticket issuing system, etc.

The NFC circuit 10 may include an antenna 11 and/or an NFC receiver 30. An RF signal may be transmitted and/or received through the antenna 11, and according to embodiments, the antenna 11 may be included in the NFC receiver 30 or an NFC transmitter. The antenna 11 may convert the RF signal received from the outside into an electrical signal, and may output the electrical signal to the NFC receiver 30. Although not shown in FIG. 1, the NFC circuit 10 may include a matching circuit, an NFC card circuit, and/or a processor.

For example, the NFC circuit 10 or an NFC device including the NFC circuit 10 may receive the RF signal from the NFC tag 20. The received RF signal may be referred to as a carrier wave, and may be a modulated signal. In embodiments, the received RF signal may be an amplitude-shift keying (ASK) signal.

The NFC receiver 30 may include a first analog-to-digital converter (ADC) 32, a second ADC 34, an I-Q demodulator 36, and/or an NFC modem 38. The I-Q demodulator 36 may be included in the NFC modem 38. According to embodiments of the inventive concepts, the NFC receiver 30 may receive an ASK signal through the antenna 11, and the received ASK signal may be input to the first ADC 32 and the second ADC 34. For example, each of the first ADC 32 and the second ADC 34 may directly sample the received ASK signal at the same frequency as, or a similar frequency to, that of the received ASK signal. In embodiments, the first ADC 32 and the second ADC 34 may sample the received ASK signal by using an undersampling method. Direct sampling may refer to a method of directly sampling a signal in an RF band without converting a signal band into an intermediate frequency of a baseband through a mixer or the like. According to the Nyquist theorem that reconstruction is possible when a frequency of an analog-to-digital (A-D) signal is equal to or less than ½ of a sampling rate, a frequency corresponding to ½ of the sampling rate may be defined as a Nyquist frequency, and undersampling may refer to a method of sampling a specific signal at a sampling rate less than a sampling rate corresponding to the Nyquist frequency. According to the NFC standard, in the case of an NFC receiver, an RF input signal (e.g., a carrier wave) input to the receiver may include an amplitude-modulated signal of 13.56 MHz band. According to embodiments of the inventive concepts, an RF input signal is not reconstructed but an envelope of the RF input signal may be reconstructed. Because a frequency of information in an amplitude of the RF input signal is less than 13.56 MHz, undersampling may be used.

The first ADC 32 and the second ADC 34 may respectively use a first clock signal CLK_1 and a second clock signal CLK_2 as sampling clock signals. The first clock signal CLK_1 and the second clock signal CLK_2 may be generated by using a clock generator (e.g., a crystal oscillator) and/or a phase shifter (not shown). In embodiments, a clock extractor may not be included in the NFC receiver 30 because a clock signal from may not be reconstructed from the received ASK. According to embodiments, when a speed of a clock signal of an ADC is increased, that is, when a frequency of a clock signal is increased, one ADC may perform sampling twice, thereby reducing the number of ADCs of the NFC receiver 30. In embodiments, a clock signal generated by the clock generator may be synchronized with a phase of the ASK signal that is an analog signal, and may have the same frequency or a similar frequency. In this case, the clock generator may be a clock extractor. According to embodiments, the frequency of the received ASK signal is greater than the Nyquist frequency of the first clock signal CLK_1. According to embodiments, the frequency of the received AM signal is greater than the Nyquist frequency of the first clock signal CLK_1.

The first ADC 32 may sample the received ASK signal by using the first clock signal CLK_1, to generate and output an in-phase (I)-sample. The second ADC 34 may sample the received ASK signal by using the second clock signal CLK_2, to generate and output a quadrature-phase (Q)-sample. In embodiments, the first clock signal CLK_1 and the second clock signal CLK_2 may be clock signals having the same frequency (or similar frequencies) and having a phase difference of 90°. Accordingly, the I-sample and the Q-sample corresponding to output signals of the first ADC 32 and the second ADC 34 may be quadrature phase samples for the received ASK signal. An IQ method may refer to a method of replacing a magnitude and a phase of a sine wave with an orthogonal coordinate system, taking the horizontal axis as I and the vertical axis as Q, and expressing an in-phase (I) signal and a quadrature (Q) signal with a phase difference of 90°. The IQ method may also correspond to a method for transmitting and receiving a digital signal. In embodiments, the first clock signal CLK_1 and the second clock signal CLK_2 may be clock signals having the same frequency (or similar frequencies) and having a phase difference of 90°, and may be clock signals respectively having phase differences of 45° and 135° from the received ASK signal. Accordingly, a magnitude of each of the I-sample and the Q-sample corresponding to output signals of the first ADC 32 and the second ADC 34 may be $$\frac{1}{\sqrt{2}}$$

of a magnitude of the ASK signal corresponding to an input signal of the first ADC 32 and the second ADC 34. A magnitude of a signal may refer to an absolute value of a peak value of the signal, which will be described below in detail with reference to FIGS. 9 and 10.

The I-Q demodulator 36 according to embodiments of the inventive concepts may be referred to as a quadrature phase demodulator, and may detect an envelope of the received ASK signal. When the envelope of the received ASK signal is A(t), because the I-sample and the Q-sample are quadrature phase signals for the received ASK signal, they may be mathematically expressed as Equation 1 in the same manner as, or in a similar manner to, a case where an analog mixer is used.

$$I = A(t)\cos(2\pi f_c t), Q = A(t)\sin(2\pi f_c t) \quad \text{[Equation 1]}$$

The I-Q demodulator 36 may detect the envelope of the received ASK signal by using a value obtained adding squares of the I-sample and the Q-sample and then finding a square root, which may be expressed as Equation 2.

$$\sqrt{I^2+Q^2}=\sqrt{A^2(t)\{\cos^2(2\pi f_c t)+\sin^2(2\pi f_c t)\}}=A(T) \quad \text{[Equation 2]}$$

The value obtained by adding squares of the I-sample and the Q-sample and then finding a square root may correspond to a value obtained by calculating a root-sum-square (RSS) value between the I-sample and the Q-sample, and may be referred to as a 'magnitude value of two quadrature phase samples' or an 'I-Q magnitude'. According to embodiments of the inventive concepts, because a magnitude value of two quadrature phase samples is used for envelope detection, sampling at a peak point of the received ASK signal may not be performed. The I-Q demodulator 36 may output the detected envelope. For example, the I-Q demodulator 36 may generate the envelope as a digital signal (e.g., generate a digital signal including digital representation of the envelope) and may output the digital signal (e.g., an output signal including the digital representation). In embodiments, because the I-Q demodulator 36 uses the I-sample and the Q-sample that are quadrature phase samples and thus may detect a phase difference, the I-Q demodulator 36 may utilize phase information as well as magnitude information of a signal. According to embodiments, the digital signal may be output to processing circuitry of a portable electronic device (e.g., a portable electronic device including the NFC receiver 30), and the processing circuitry may perform further operations using the digital signal. For example, the processing circuitry of the portable electronic device may generate a screen based on information contained in the digital signal (e.g., the digital representation), and output the screen to a display (e.g., a display of the portable electronic device). The processing circuitry of the portable electronic device may also perform a measurement, perform a computation and/or generate a communication signal based on the information contained in the digital signal. The processing circuitry of the portable electronic device may store, and/or transmit to another device, a result of the measurement, a result of the computation and/or the communication signal.

The NFC modem 38 may receive the envelope and the phase information output from the I-Q demodulator 36 as a digital signal, and may extract information included in an amplitude of the received ASK signal from the envelope. For example, the NFC modem 38 may determine whether the received ASK signal is a signal conforming to an NFC protocol, and may perform reception processing according to the NFC protocol such as checking a distance by using a magnitude of a carrier wave including distance information from the NFC tag 20.

Accordingly, the NFC receiver 30 according to embodiments of the inventive concepts may asynchronously receive a signal, and may substantially extend an input range of an ADC, thereby improving the reception performance of the NFC receiver 30. Also, because a magnitude of a quadrature phase signal for a carrier wave is used during demodulation and thus synchronization of the carrier wave and a clock signal may not be performed, a complex analog circuit for synchronization may be omitted.

Although not shown in FIG. 1, the NFC circuit 10 may include an NFC transmitter or a controller.

For example, the NFC transmitter may receive a control signal for detecting the NFC tag 20 from the controller, and may output a transmission signal through the antenna 11 according to a clock signal.

The controller of the NFC circuit 10 may control operations of other elements such as the NFC receiver 30 and/or the NFC transmitter. For example, the controller may control the NFC receiver 30 and/or the NFC transmitter to operate in a standby mode or a reader mode. The NFC circuit 10 may maintain the standby mode when the NFC tag 20 is not close enough to perform wireless communication, and may perform the reader mode when the NFC tag 20 is close enough to perform wireless communication. The controller may transmit a control signal for detecting the NFC tag 20 to the NFC transmitter in the standby mode, and may determine whether to switch to the reader mode by receiving a demodulated signal from the NFC receiver 30 as reception data.

Figure 2A:
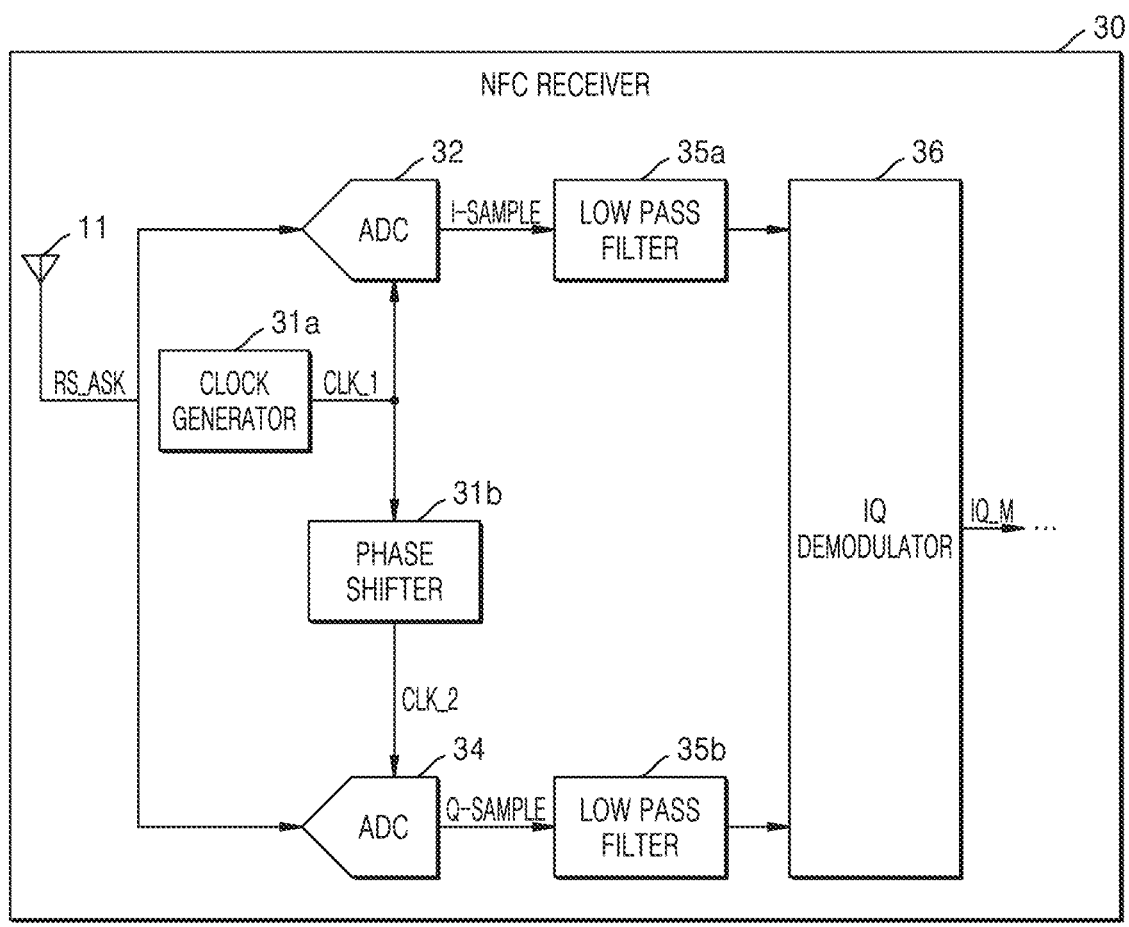
FIG. 2A is a block diagram illustrating an NFC receiver, according to embodiments of the inventive concepts.
Figure 2B:
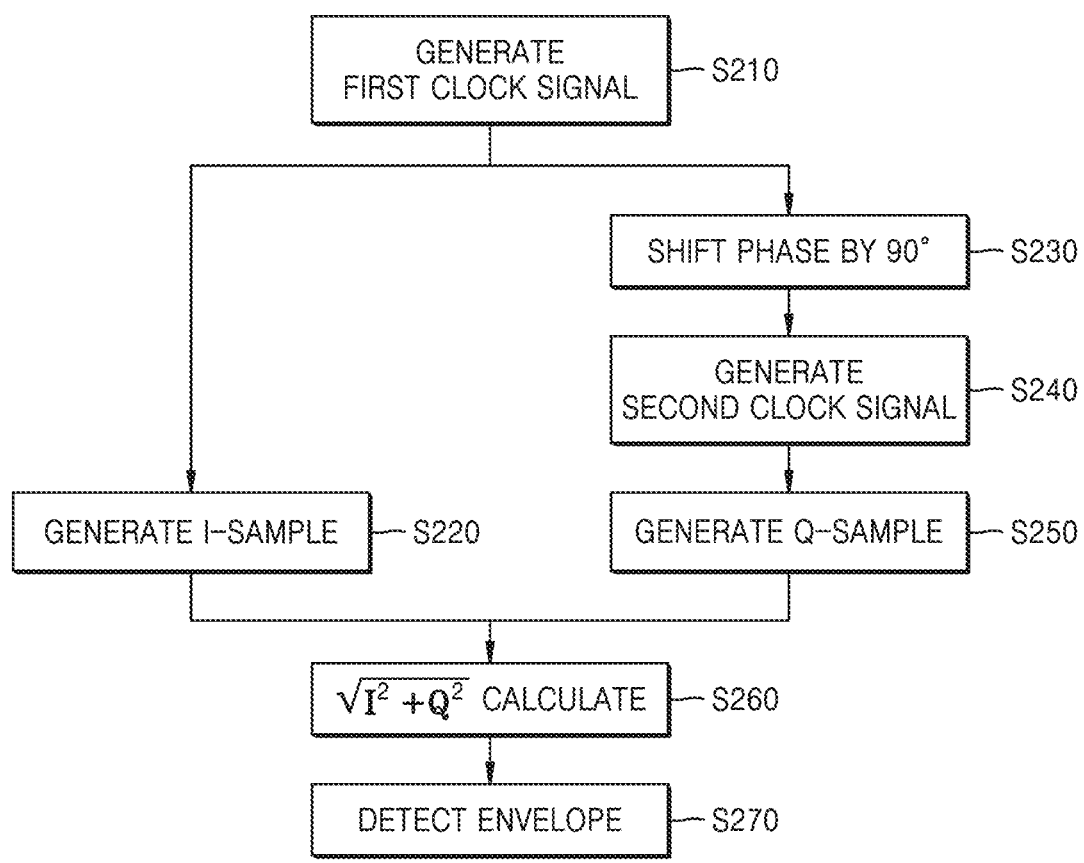
FIG. 2B is a flowchart illustrating an operation of an NFC receiver, according to embodiments of the inventive concepts.

FIG. 2A is a block diagram illustrating an NFC receiver, according to embodiments of the inventive concepts. FIG. 2B is a flowchart illustrating an operation of an NFC receiver, according to embodiments of the inventive concepts.

Referring to FIG. 2A, the NFC receiver 30 may include the antenna 11, a clock generator 31a, a phase shifter 31b, the first ADC 32, the second ADC 34, a first low-pass filter (LPF) 35a, a second LPF 35b, and/or the I-Q demodulator 36.

Referring to FIGS. 2A and 2B, in operation S210, the clock generator 31a may generate the first clock signal CLK_1. According to embodiments of the inventive concepts, a frequency of the first clock signal CLK_1 may be set to be less than twice a frequency of a received ASK signal RS_ASK according to an undersampling method. For example, the frequency of the first clock signal CLK_1 may be the same as, or similar to, the frequency of the received ASK signal RS_ASK. Because a peak point of the received ASK signal RS_ASK may not be sampled, synchronization of the received ASK signal RS_ASK and the first clock signal CLK_1 may not be performed. In other words, a phase of the first clock signal CLK_1 may be different from a phase of the received ASK signal RS_ASK.

In operation S220, the first ADC 32 may receive the first clock signal CLK_1, and may generate an I-sample by directly sampling the received ASK signal RS_ASK based on the first clock signal CLK_1. When compared to an indirect sampling method in which oversampling is performed by converting a frequency, a direct sampling method in which an ADC may directly process sampled data may have advantages in that because an analog mixer or an analog filter may be omitted and most elements other than the first ADC 32 and the second ADC 34 may be implemented as digital elements, an analog circuit may be simplified. For example, the I-sample may be output as n bits (n is a natural number equal to or greater than 1) according to the number of bits of the first ADC 32. The I-sample generated in operation S220 may pass through the first LPF 35a to remove noise.

In operations S230 and S240, the phase shifter 31b may receive the first clock signal CLK_1, and may shift the phase of the first clock signal CLK_1 by 90° to generate the second clock signal CLK_2. The first clock signal CLK_1 and the second clock signal CLK_2 correspond to quadrature phase signals for the received ASK signal RS_ASK.

In operation S250, the second ADC 34 may receive the second clock signal CLK_2, and may generate a Q-sample by directly sampling the received ASK signal RS_ASK based on the second clock signal CLK_2. For example, the Q-sample may be output as n bits (n is a natural number equal to or greater than 1) according to the number of bits of the second ADC 34. The Q-sample generated in operation S250 may pass through the second LPF 35b to remove noise.

In operation S260, the I-Q demodulator 36 may receive the I-sample and the Q-sample from which noise is removed, and may calculate an RSS value between the I-sample and the Q-sample. In operation S270, the I-Q demodulator 36 may detect an envelope IQ_M of the received ASK signal by using the RSS value between the I-sample and the Q-sample. Envelope information having the same value, or similar values, may be obtained in all periods of the received ASK signal RS_ASK regardless of the phase of the first clock signal, and thus even when there is a phase error at a sampling point in an actual environment, the envelope IQ_M may be stably extracted. An output of the I-Q demodulator 36 may be a digital signal IQ_M in which an I_Q magnitude is digitally expressed by performing an operation by using the I-sample having n bits and the Q-sample having n bits.

Figure 3:
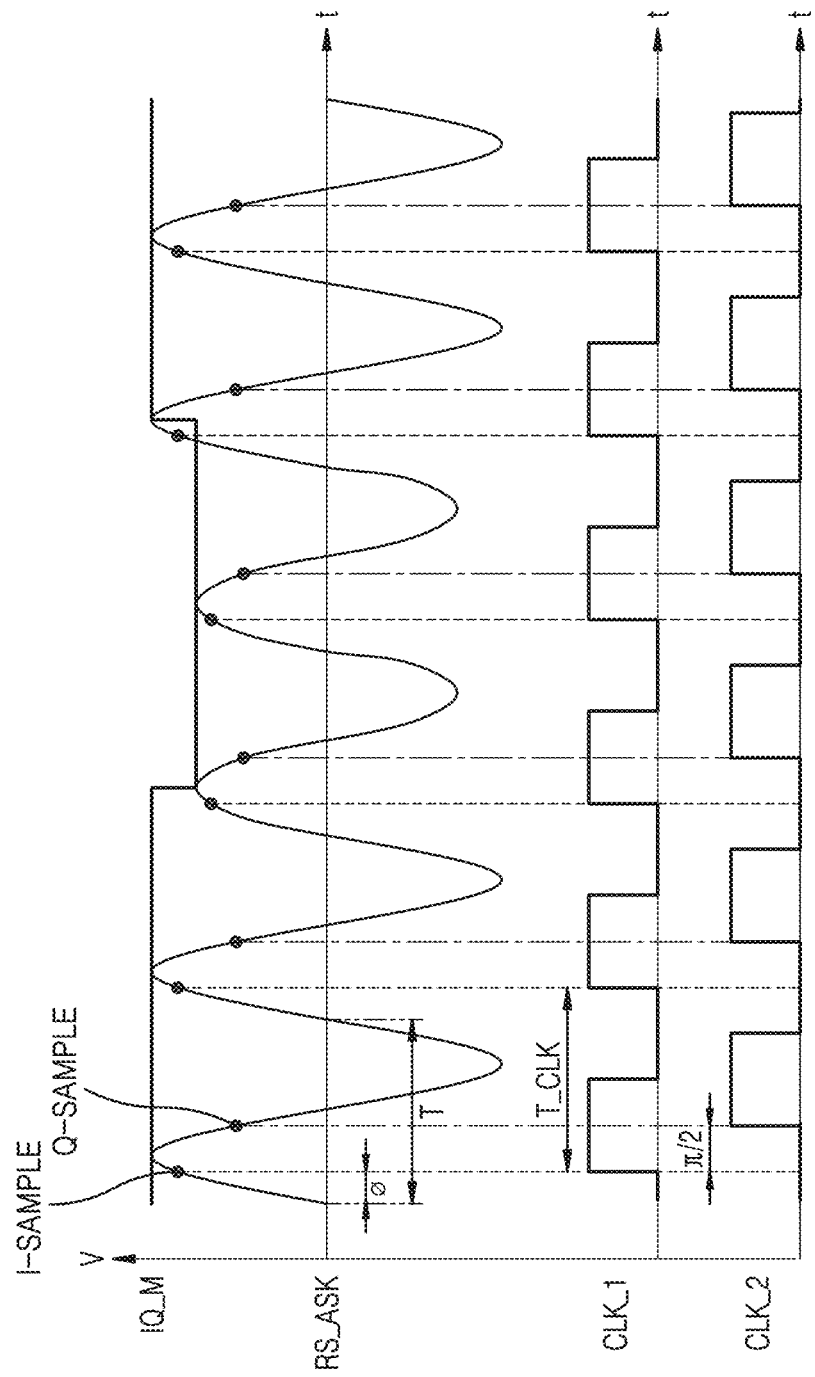
FIG. 3 is a timing diagram illustrating internal signals of the NFC receiver of FIG. 2A.

FIG. 3 is a timing diagram illustrating internal signals of the NFC receiver of FIG. 2A.

FIG. 3 is a timing diagram illustrating the ASK signal RS_ASK received by the NFC receiver 30 (see FIG. 2A), the first clock signal CLK_1 and the second clock signal CLK_2, an output signal I-SAMPLE of the first ADC 32 (see FIG. 2A), an output signal Q-SAMPLE of the second ADC 34 (see FIG. 2A), and an output signal IQ_M of the I_Q demodulator 36 (see FIG. 2A).

The following will be described assuming that a period T_CLK of the first clock signal CLK_1 and the second clock signal CLK_2 is the same as (or similar to) a period T of the received ASK signal RS_ASK. A sampling rate of the first clock signal CLK_1 and the second clock signal CLK_2 is not limited thereto. For example, the period T_CLK of the first clock signal CLK_1 and the second clock signal CLK_2 may be greater than the period T of the received ASK signal RS_ASK, or the first clock signal CLK_1 and the second clock signal CLK_2 may have another sampling rate of an undersampling method.

The NFC receiver may receive an RF signal through an antenna, and the received ASK signal may be an amplitude-modulated sinusoidal signal RS_ASK. A transmitting entity, for example, an NFC tag, that transmits the ASK signal to the NFC receiver may carry information to be sent in an amplitude and may transmit the ASK signal. Referring to the timing diagram of the ASK signal RS_ASK having the period T of FIG. 3, the RF signal received through the antenna may be the ASK signal RS_ASK in which sinusoidal signals having different amplitudes to include different information are periodically repeated.

The first clock signal CLK_1 generated by a clock generator may be a clock signal that enables a first ADC to obtain an I-sample value by sampling the received ASK signal at a rising edge (e.g., a rising edge of the first clock signal CLK_1). The period T_CLK of the first clock signal CLK_1 may be the same as (or similar to) the period T of the received ASK signal. A phase of the first clock signal CLK_1 may be the same as (or similar to) the phase of the received ASK signal, or may be different from the phase of the received ASK signal having a phase offset ø.

The second clock signal CLK_2 whose phase is shifted by 90° from the first clock signal CLK_1 by a phase shifter may be a clock signal that enables a second ADC to obtain a Q-sample value by sampling the received ASK signal at a rising edge (e.g., a rising edge of the second clock signal CLK_2).

As a result of sampling based on the first clock signal and the second clock signal, the first ADC and the second ADC may respectively output an I-sample and a Q-sample that are quadrature phase samples for the received ASK signal.

The output signal IQ_M of the I-Q demodulator may be expressed as a value obtained by adding squares of the I-sample and the Q-sample, and then finding a square root. Referring to the timing diagram of the ASK signal RS_ASK having the period T of FIG. 3, in a first period, the value obtained by adding squares of the I-sample and the Q-sample, and then finding a square root, may be the same as (or similar to) a peak value of the received ASK signal. This is because the received ASK signal is in the form of a sine wave and the I-sample and the Q-sample are quadrature phase samples for the received ASK signal. For example, even when the phase offset ø of the first clock signal CLK_1 is set to a certain value, an I-Q magnitude of the I-sample and the Q-sample having a phase difference of 90° may be the same as (or similar to) a peak value of the received ASK signal, and thus a constant envelope may be extracted regardless of the phase offset ø. The I-Q magnitude may be constant during one period T of the received ASK signal RS_ASK, regardless of the phase offset ø due to the first clock signal and the second clock signal.

Figure 4:
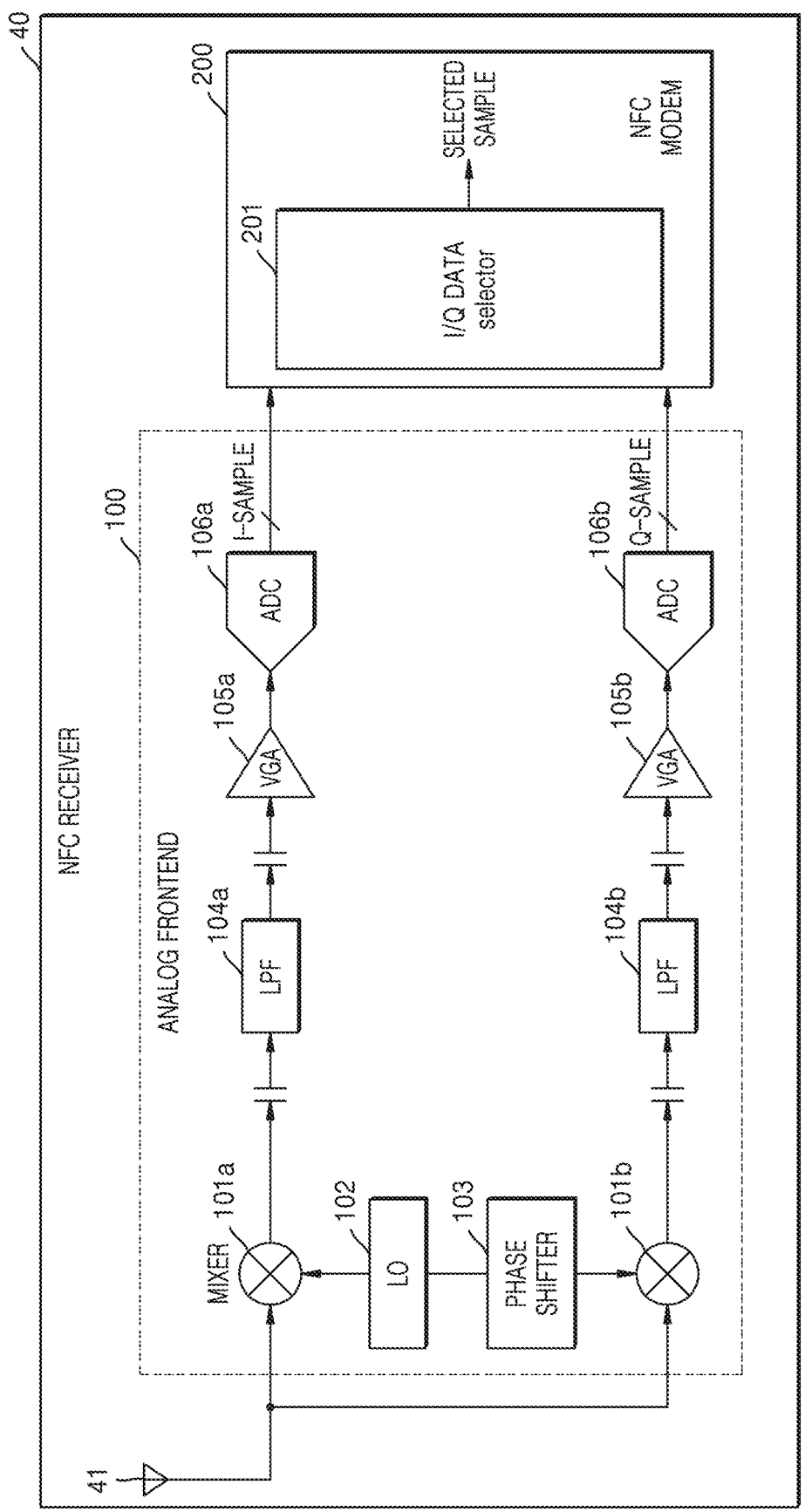
FIG. 4 is a block diagram illustrating an NFC receiver, according to a comparative example.

FIG. 4 is a block diagram illustrating an NFC receiver, according to a comparative example.

Referring to FIG. 4, an NFC receiver 40 according to a comparative example may include an antenna 41, an analog frontend 100 including a plurality of analog devices, and/or an NFC modem 200.

The NFC receiver 40 according to a comparative example may include an analog circuit (e.g., the analog frontend 100) including a local oscillator 102, a phase shifter 103, a first mixer 101a, a second mixer 101b, a first LPF 104a, a second LPF 104b, a first variable gain amplifier (VGA) 105a, a second VGA 105b, and/or a plurality of capacitors, at a frontend of a first and second ADCs 106a and 106b. This method of directly converting a frequency of an RF signal received through the antenna 41 corresponds to a receiver design method that converts and samples a signal band into an intermediate frequency of a baseband through the first and second mixers 101a and 101b such as an analog mixer. The local oscillator 102 may generate a first clock signal reconstructed from a received ASK signal for synchronous reception. Alternatively, the first clock signal may be generated by using a clock extractor that extracts a clock of the received ASK signal. The phase shifter 103 may shift a phase of the first clock signal by 90° to output a second clock signal, the plurality of capacitors may remove a direct current (DC) component, and the first and second VGAs 105a and 105b may amplify a gain in accordance with an input range of the NFC modem. As such, the analog circuit including the plurality of analog devices (e.g., the complexity of the analog circuit) may cause management difficulties during design or test.

The first ADC 106a may sample the received ASK signal at a peak point of the received ASK signal based on a third clock signal, and may output an I-sample. The second ADC 106b may sample the received ASK signal based on a fourth clock signal, and may output a Q-sample. In this case, because the peak point of the received ASK signal should be accurately found, the third clock signal or the fourth clock signal should be synchronized with the received ASK signal so that a phase of the third clock signal or the fourth clock signal accurately matches a phase of the received ASK signal.

The NFC modem 200 may include an I/Q data selector 201. The I/Q data selector 201 may select a signal having better quality from among the I-sample and the Q-sample received from the first and second ADCs 106a and 106b. Although the first and second clock signals and the received ASK signal are already synchronized, the peak point of the received ASK signal may vary according to various communication environments. According to cases, the I-sample may be a signal having better quality or the Q-sample may be a signal having better quality. When the I/Q data selector 201 selects and outputs one of the I-sample and the Q-sample, the NFC modem 200 may extract information carried in an amplitude of the ASK signal by using the selected sample.

Unlike the NFC receiver 40 according to the comparative example, the NFC receiver 30 (see FIG. 2A) according to embodiments of the inventive concepts may not continuously, accurately detect a peak value of the continuously received ASK signal in accordance with a phase of a carrier wave by using a clock extractor, and may reconstruct an envelope to the same magnitude (or a similar magnitude) even when sampling is performed at any point, thereby improving the stability of NFC reception. Also, because additional analog circuits such as a delay correction circuit for phase synchronization between the received ASK signal and clock signals may be omitted, and a mixer, a down converter, etc. for removing a carrier wave may be omitted due to direct sampling, a structure of NFC receiver may be simplified and may be digitally implemented.

Figure 5B:
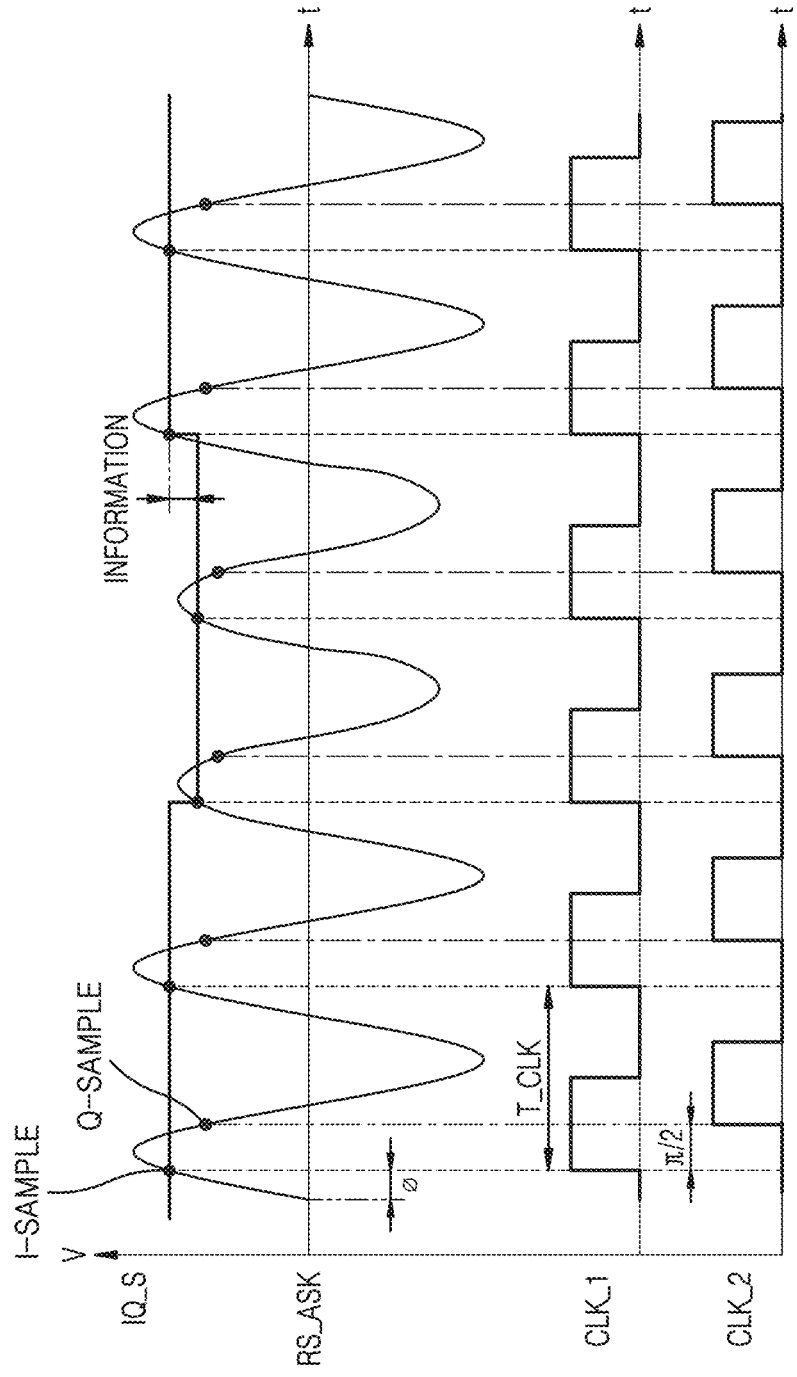

FIGS. 5A and 5B are timing diagrams illustrating internal signals of the NFC receiver of FIG. 4. In FIGS. 5A and 5B, the same elements as, or similar elements to, those in FIG. 3 will not be repeatedly described.

FIG. 5A is a timing diagram illustrating internal signals of an NFC receiver when phases of a received ASK signal and clock signals are synchronized, in the NFC receiver according to the comparative example of FIG. 4. FIG. 5B is a timing diagram illustrating internal signals of an NFC receiver when phases of a received ASK signal and clock signals are not synchronized, in the NFC receiver according to the comparative example of FIG. 4. Cases where a received ASK signal and clock signals are not synchronized may include, for example, but are not limited to, a case where a clock signal of the ASK signal is not correctly reconstructed due to a hardware challenge of the analog frontend 100 (see FIG. 4), and/or a case where a transmitting entity of an RF signal is changed and thus a phase of the ASK signal is changed.

FIG. 5A is a timing diagram illustrating the ASK signal RS_ASK received by the NFC receiver 40 (see FIG. 4), the first clock signal CLK_1 and the second clock signal CLK_2, an output signal I-SAMPLE of the first ADC 106A (see FIG. 4), an output signal Q-SAMPLE of the second ADC 106b (see FIG. 4), and an output signal IQ_S of the I-Q data selector 201 (see FIG. 4).

The following will be described assuming that the period T_CLK of the first clock signal CLK_1 and the second clock signal CLK_2 is the same as (or similar to) the period T of the received ASK signal RS_ASK, and the first clock signal CLK_1 and the second clock signal CLK_2 may have another sampling rate of an undersampling method.

The NFC receiver according to the comparative example of FIG. 4 may receive an amplitude-modulated sinusoidal signal RS_ASK, and a local oscillator and a phase shifter included in the NFC receiver may respectively generate the first clock signal CLK_1 and the second clock signal CLK_2 that has a phase difference of 90° from the first clock signal CLK_1.

As a result of sampling based on the first clock signal and the second clock signal, a first ADC and a second ADC may respectively output an I-sample and a Q-sample that are quadrature phase samples for the received ASK signal.

Referring to FIG. 5A, the local oscillator generates the first clock signal CLK_1 so that a phase of an oscillation signal and a phase of the received ASK signal are accurately synchronized with each other. In this case, the first ADC may output the I-sample at a peak point of the received ASK signal to accurately have a phase difference of 90° from the received ASK signal, and the second ADC may output the Q-sample based on the generated second clock signal CLK_2 to accurately have a phase difference of 180° from the received ASK signal. For example, in a first period, an I/Q data selector may compare the I-sample with the Q-sample and may select the I-sample having better quality, and may extract an envelope IQ_S corresponding to an output signal of the I/Q data selector by using the I-sample or Q-sample selected in every period. Each I-sample or Q-sample selected in every period corresponds to a value sampled by accurately detecting a peak.

Referring to FIG. 5B, the local oscillator fails to generate the first clock signal CLK_1 so that a phase of an oscillation signal and a phase of the received ASK signal are accurately synchronized with each other. In this case, the first ADC may not output the I-sample at a peak point of the received ASK signal. For example, the first ADC may output the I-sample at a point other than a peak of the received ASK signal so that there is a phase difference of an phase offset ø other than 90° from the received ASK signal. In a first period, the I/Q data selector may compare the I-sample with the Q-sample and may select the I-sample having better quality, and the I-sample may have a smaller magnitude when compared to the I-sample of FIG. 5A. The I/Q data selector may extract the envelope IQ_S by using the I-sample or Q-sample selected in every period. When compared to the I-sample of FIG. 5A, because an amplitude of the envelope corresponding to an output signal of the I/Q data selector is relatively small and the amount of carried information is also small, the NFC reception performance is relatively low.

Because amplitude modulation is a method of transmitting information by using the strength of an amplitude of a carrier wave, when the NFC receiver according to the comparative example of FIG. 4 fails to accurately synchronize a received ASK signal and a clock signal according to various communication environments, the reception performance of the NFC receiver may be degraded. In contrast, because the NFC receiver according to embodiments of the inventive concepts may constantly detect an envelope by using an I-Q magnitude regardless of synchronization between a received ASK signal and a clock signal (see FIG. 3), the reception performance of the NFC receiver may be kept stable.

Figure 6:
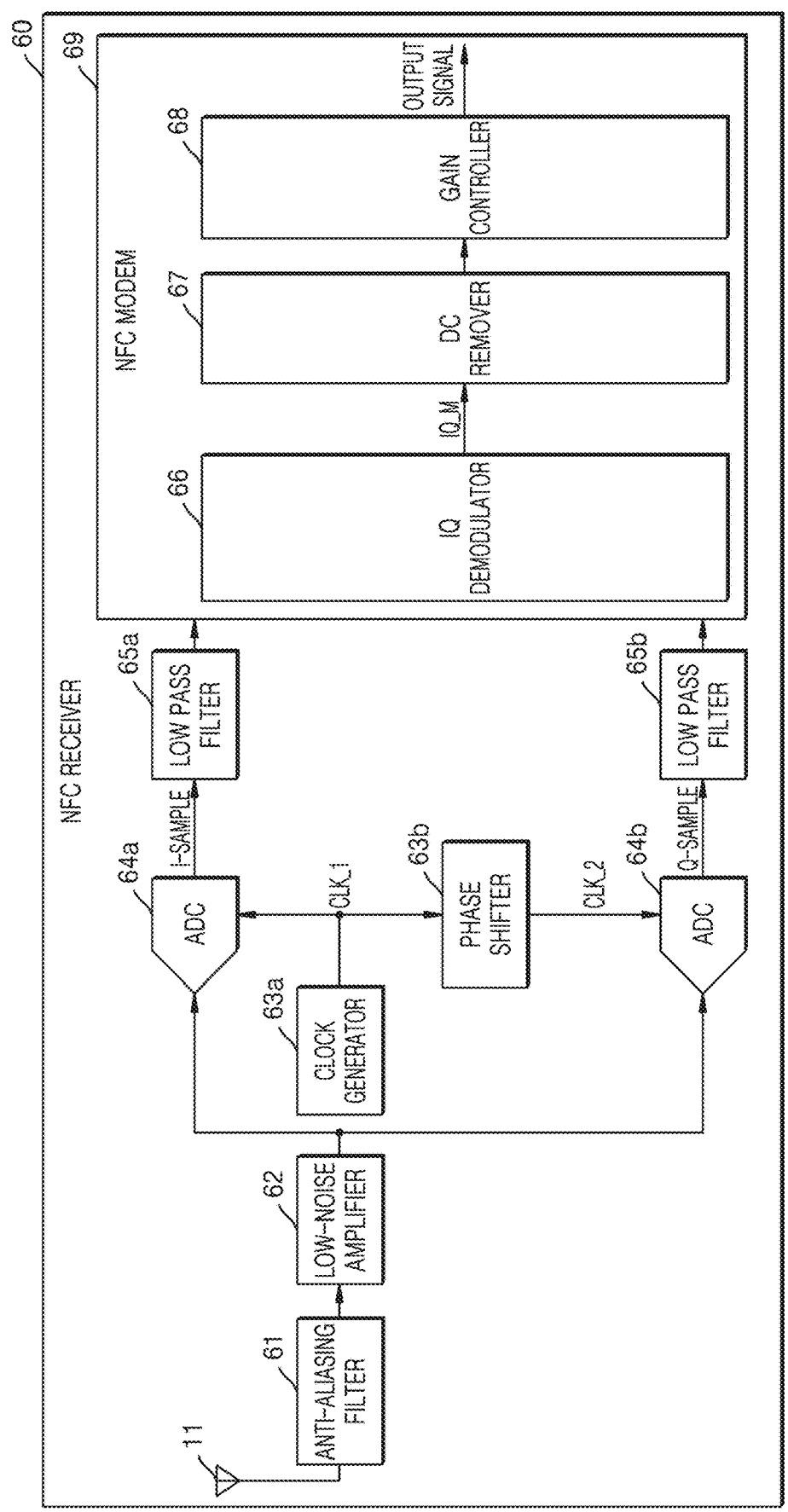
FIG. 6 is a block diagram illustrating an NFC receiver, according to embodiments of the inventive concepts.

FIG. 6 is a block diagram illustrating an NFC receiver, according to embodiments of the inventive concepts. In FIG. 6, a repeated description of the same elements as (or similar elements to) those in FIG. 2A will be omitted.

Referring to FIG. 6, an NFC receiver 60 may include the antenna 11, an anti-aliasing filter 61, a low-noise amplifier (LNA) 62, a clock generator 63a, a phase shifter 63b, a first ADC 64a, a second ADC 64b, a first LPF 65a, a second LPF 65b, and/or an NFC modem 69.

The anti-aliasing filter 61 included in the NFC receiver 60 may be a filter for reducing sampling distortion components due to undersampling, and may be implemented as an LPF for attenuating high frequency components of a received ASK signal. The sampling distortion components may be generated when adjacent frequency waveforms in a main frequency domain overlap each other in a sampling process of the first ADC or the second ADC. According to embodiments, the anti-aliasing filter 61 may remove a frequency component higher than a Nyquist frequency for the first clock signal.

The LNA 62 included in the NFC receiver 60 may minimize or reduce noise, and may amplify the received ASK signal. In embodiments, the LNA 62 may amplify the received ASK signal to a signal having an appropriate level suitable for an input range of the first ADC, or the second ADC, so that the first ADC or the second ADC is better able to process the signal.

The NFC modem 69 may include an I-Q demodulator 66, a DC remover 67, and/or a gain controller 68.

The DC remover 67 included in the NFC receiver 60 may remove a DC offset component, and according to embodiments, the DC remover 67 may be a digital filter. According to embodiments, the DC remover 67 may remove the DC offset component of the digital signal (IQ_M) output by the I-Q demodulator 66. The DC remover 67 may output the processed digital signal (e.g., with the DC offset component removed) to the gain controller 68.

The gain controller 68 included in the NFC receiver 60 may adjust a gain according to an input digital signal. According to an input range of the NFC modem 69, a gain of the digital signal received by the gain controller 68 may be amplified or attenuated and may be output. According to embodiments, the gain controller 68 may control (e.g., adjust) the gain of the digital signal received from the DC remover 67, and output the resulting digital signal (e.g., an output signal).

Figure 7:
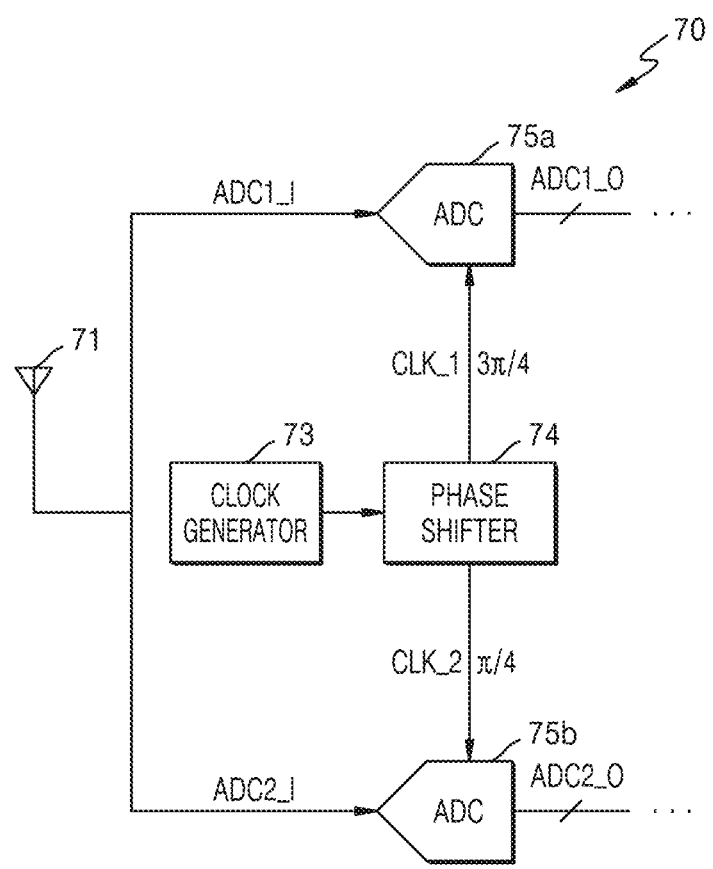
FIG. 7 is a block diagram illustrating a part of an NFC receiver, according to embodiments of the inventive concepts.

FIG. 7 is a block diagram illustrating a part of an NFC receiver, according to embodiments of the inventive concepts.

Referring to FIG. 7, a part of an NFC receiver 70 including an antenna 71, a clock generator 73, a phase shifter 74, a first ADC 75a and/or a second ADC 75b is illustrated.

The clock generator 73 may generate a reference clock signal. According to embodiments of the inventive concepts, a frequency of the reference clock signal may be set to be less than twice a frequency of a received ASK signal according to an undersampling method. For example, the frequency of the reference clock signal may be the same as (or similar to) the frequency of the received ASK signal. The reference clock signal may be reconstructed from the received ASK signal, and may be synchronized with a phase of the received ASK signal and have the same frequency (or a similar frequency). The clock generator 73 may be a clock extractor.

According to embodiments of the inventive concepts, the phase shifter 74 may receive the reference clock signal, may generate the first clock signal CLK_1 by shifting the phase of the reference clock signal by 45° and may generate the second clock signal CLK_2 by shifting the phase of the reference clock signal by 135°. The first clock signal CLK_1 and the second clock signal CLK_2 may be used as sampling signals of the first ADC 75a and the second ADC 75b.

The first ADC 75a may receive the first clock signal CLK_1, and may generate a digital output signal ADC1_O by directly sampling a received analog input signal ADC1_1 based on the first clock signal CLK_1. For example, the first ADC 75a may generate an I-sample by directly sampling the ASK signal passing through an attenuator based on the first clock signal CLK_1.

The second ADC 75b may receive the second clock signal CLK_2, and may generate a digital output signal ADC2_O by directly sampling a received analog input signal ADC2_1 based on the second clock signal CLK_2. For example, the second ADC 75b may generate a Q-sample by directly sampling the ASK signal passing through the attenuator based on the second clock signal CLK_2.

In order for an ADC to directly sample an ASK signal received from an antenna, a high-resolution ADC may be used. The high-resolution ADC having a large input range may have good performance in terms of a signal-to-noise ratio (SNR). The input range may refer to a range of an input signal in which the ADC may normally operate without saturation of an output value of the ADC, and may be a specification value determined during design. For example, the ADC may be designed to have an input range of 0 V to 3 V.

The NFC receiver 70 may include an attenuator (not shown) that attenuates a magnitude of a signal. In the case of the NFC receiver 70, an ASK signal at an end of the antenna 71 may have a value exceeding the input range of the ADC. For example, a peak-to-peak value of the ASK signal at the end of the antenna 71 may be 20 V, and the input range of the ADC may be from 0 V to 5 V. In this case, the ASK signal received from the antenna 71 may be attenuated in accordance with the input range of the ADC, and then transmitted to the first ADC 75a and the second ADC 75b. This attenuation may be a constraint on the reception performance of the NFC receiver that receives information in an amplitude of the signal.

However, when designing the ADC, it is difficult to extend the input range of the ADC due to various factors. With respect to the NFC receiver 70, according to embodiments of the inventive concepts, when the same ADC is (or similar ADCs are) used, the input range of the ADC may be substantially extended, and a specific operation principle will now be described with reference to FIG. 8A.

Figure 8A:
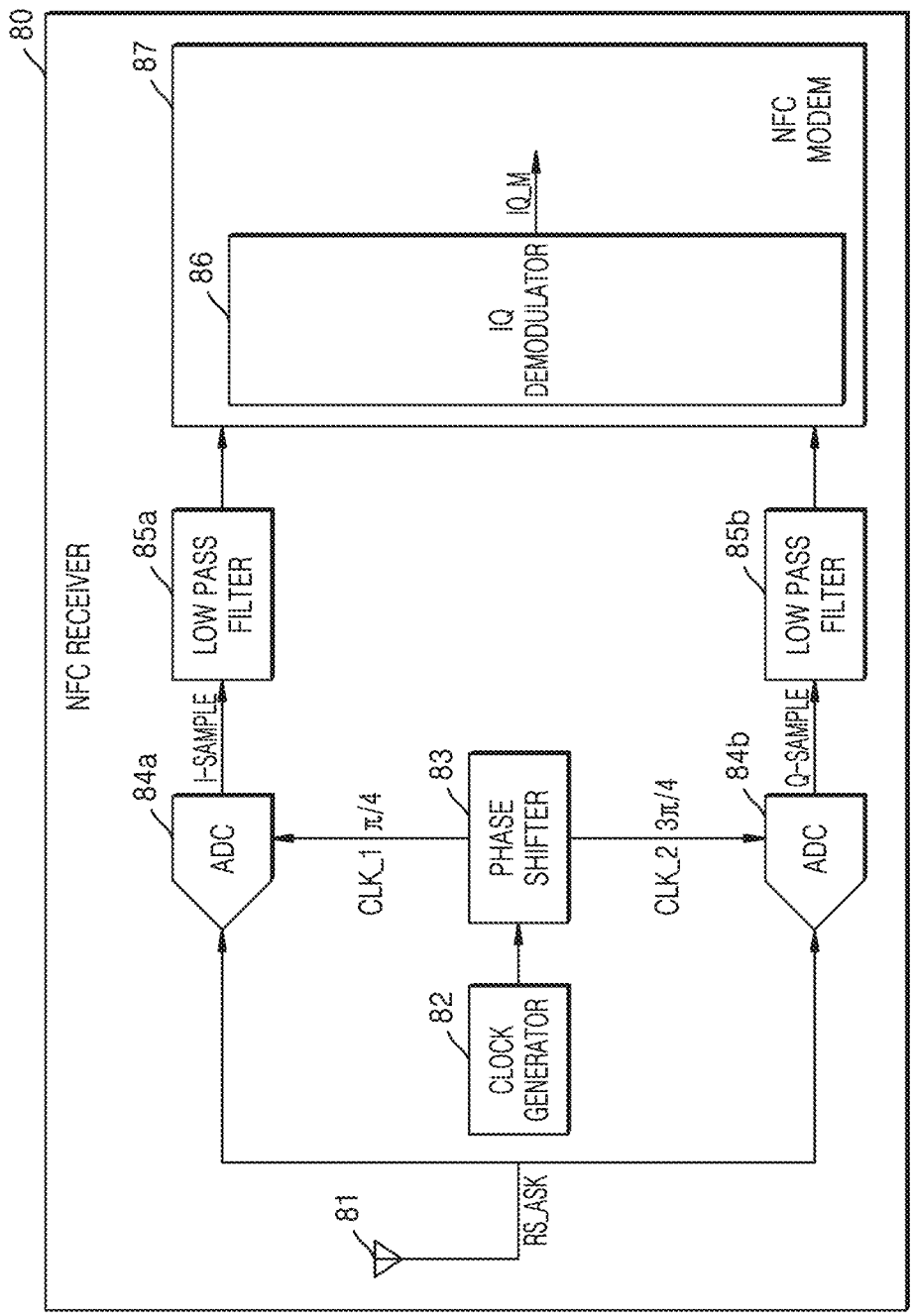
FIG. 8A is a block diagram illustrating an NFC receiver, according to embodiments of the inventive concepts.
Figure 8B:
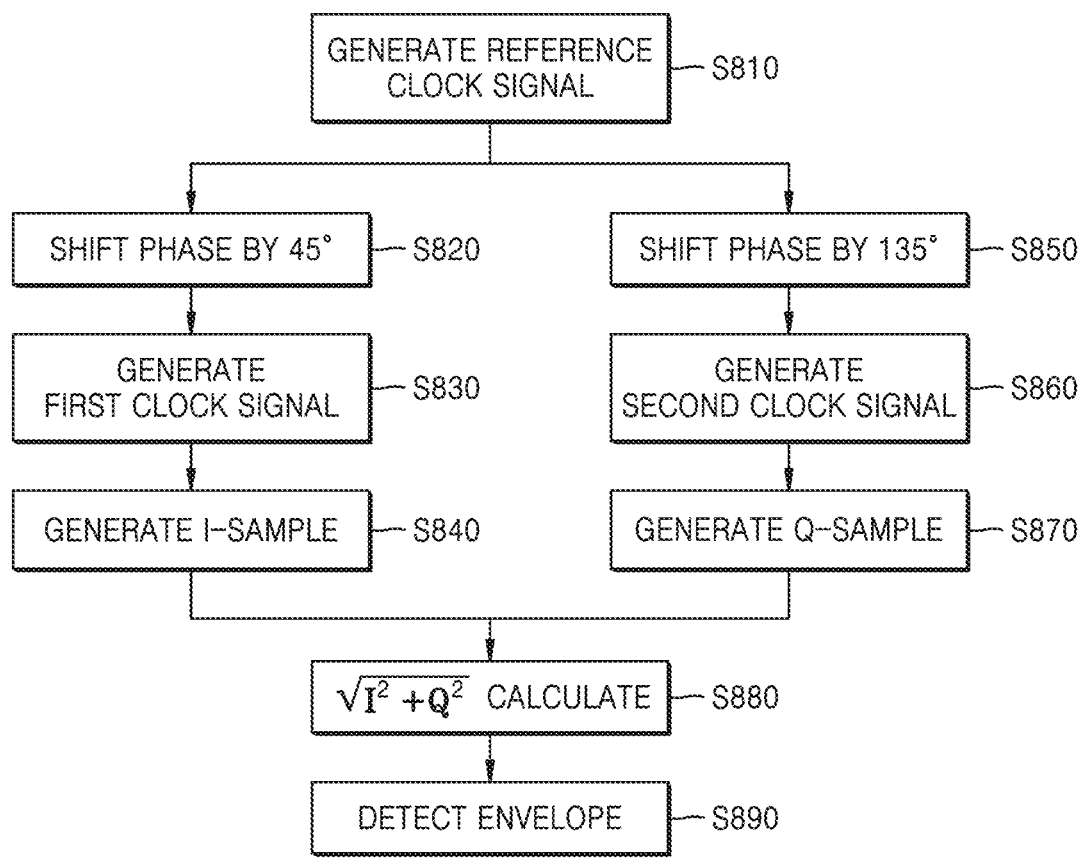
FIG. 8B is a flowchart illustrating an operation of an NFC receiver, according to embodiments of the inventive concepts.

FIG. 8A is a block diagram illustrating an NFC receiver, according to embodiments of the inventive concepts. FIG. 8B is a flowchart illustrating an operation of an NFC receiver, according to embodiments of the inventive concepts.

Referring to FIG. 8A, an NFC receiver 80 may include an antenna 81, a clock generator 82, a phase shifter 83, a first ADC 84a, a second ADC 84b, a first LPF 85a, a second LPF 85b, an I-Q demodulator 86, and/or an NFC modem 87.

Referring to FIGS. 8A and 8B, in operation S810, the clock generator 82 may generate a reference clock signal. According to embodiments of the inventive concepts, a frequency of the reference clock signal may be set to be less than twice a frequency of a received ASK signal according to an undersampling method. For example, the frequency of the reference clock signal may be the same as (or similar to) the frequency of the received ASK signal RS_ASK.

In operations S820 and S830, the phase shifter 83 may receive the reference clock signal, and may generate the first clock signal CLK_1 by shifting a phase of the reference clock signal by 45°.

In operation S840, the first ADC 84a may receive the first clock signal CLK_1, and may generate an I-sample by directly sampling the received ASK signal RS_ASK based on the first clock signal CLK_1. For example, the I-sample may be output as n bits (n is a natural number equal to or greater than 1) according to the number of bits of the first ADC 84a. A magnitude when the generated I-sample is expressed as an analog value may be referred to as a 'value of the I-sample', and the value of the I-sample may correspond to $$\frac{1}{\sqrt{2}}$$

times a peak value of the received ASK signal RS_ASK. In operation S840, the generated I-sample may pass through the first LPF 85a to remove noise.

In operations S850 and S860, the phase shifter 83 may receive the reference clock signal, and may generate the second clock signal CLK_2 by shifting the phase of the reference clock signal by 135°. The first clock signal CLK_1 and the second clock signal CLK_2 may correspond to quadrature phase signals for the received ASK signal RS_ASK.

In operation S870, the second ADC 84b may receive the second clock signal CLK_2, and may generate a Q-sample by directly sampling the received ASK signal RS_ASK based on the second clock signal CLK_2. For example, the Q-sample may be output as n bits (n is a natural number equal to or greater than 1) according to the number of bits of the second ADC 84b. A magnitude when the generated Q-sample is expressed as an analog value may be referred to as a 'value of the Q-sample', and the value of the Q-sample may correspond to $$\frac{1}{\sqrt{2}}$$

times the peak value of the received ASK signal RS_ASK. The Q-sample generated in operation S870 may pass through the second LPF 85b to remove noise. The I-sample and the Q-sample may correspond to quadrature phase samples for the received ASK signal RS_ASK.

In operation S880, the I-Q demodulator 86 may receive the I-sample and the Q-sample from which noise is removed, and may calculate an RSS value between the I-sample and the Q-sample, and the RSS value between the I-sample and the Q-sample may be referred to as an 'I-Q magnitude'. In operation S890, the I-Q demodulator 86 may detect an envelope IQ_M of the received ASK signal by using the calculated I-Q magnitude. An output of the I-Q demodulator 86 may be the digital signal IQ_M in which the I-Q magnitude is digitally expressed by performing an operation by using the I-sample having n bits and the Q-sample having n bits.

The NFC modem 87 may receive the envelope and phase information output from the I-Q demodulator 86 as a digital signal, and may extract information included in an amplitude of the received ASK signal from the envelope. For example, the NFC modem 87 may determine whether the received ASK signal is a signal conforming to an NFC protocol, and may perform reception processing according to the NFC protocol such as checking a distance by using a magnitude of a carrier wave including distance information from the NFC tag 20.

Because the NFC receiver 80 according to embodiments of the inventive concepts uses quadrature phase signals having phase differences of 45° and 135°, and uses the I-sample and the Q-sample each having a value less than a magnitude of the received ASK signal, that is, having a value $$\frac{1}{\sqrt{2}}$$

times the magnitude (e.g., a peak or highest magnitude) of the received ASK signal, the same effect as (or a similar effect to) substantially extending an input range of the first ADC 84a and the second ADC 84b may be achieved.

Figure 9:
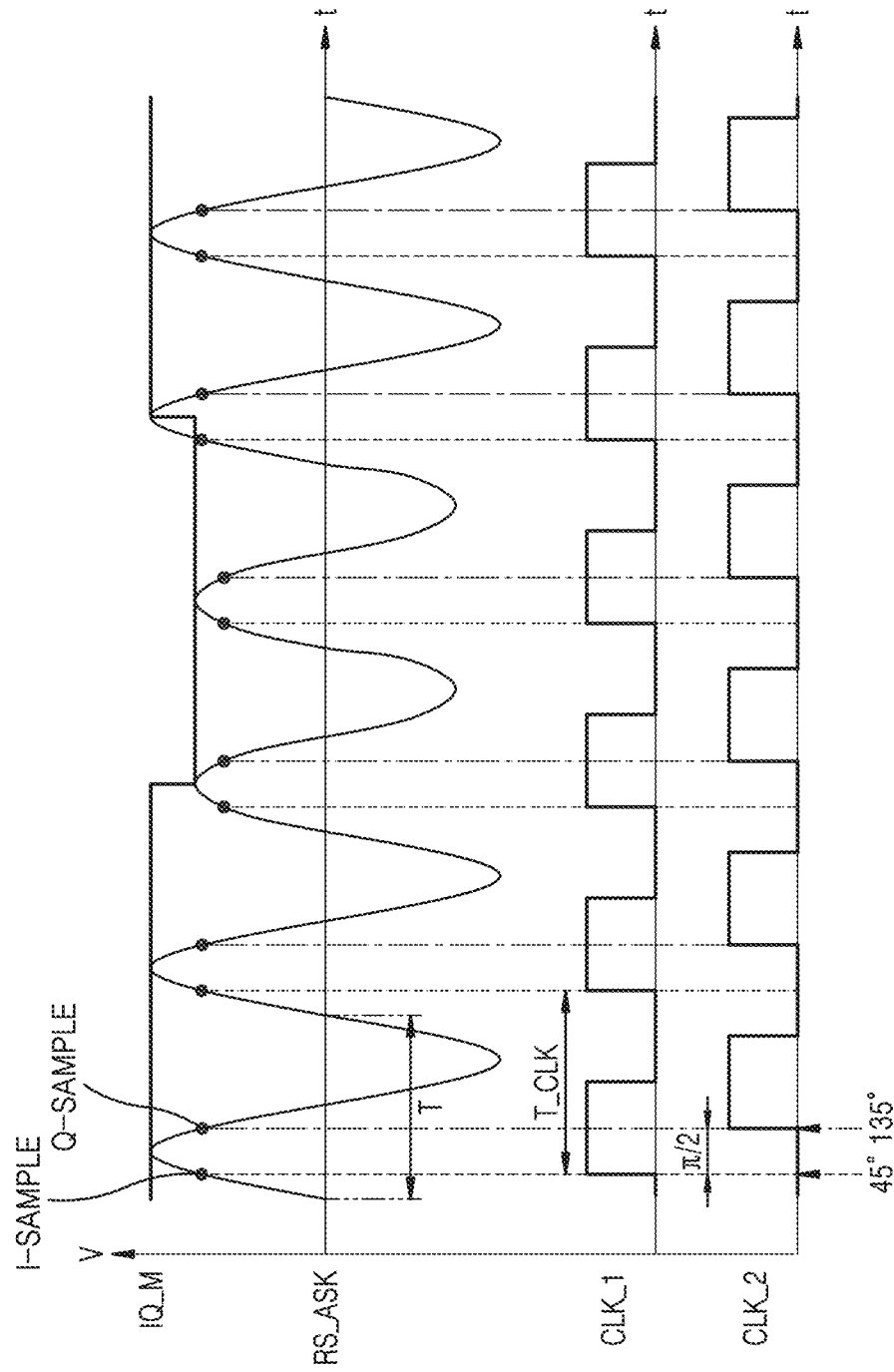
FIG. 9 is a timing diagram illustrating internal signals of the NFC receiver of FIG. 8A.

FIG. 9 is a timing diagram illustrating internal signals of the NFC receiver of FIG. 8A.

FIG. 9 is a timing diagram illustrating the ASK signal RS_ASK received by the NFC receiver 80 (see FIG. 8A), the first clock signal CLK_1 and the second clock signal CLK_2, an output signal I-SAMPLE of the first ADC 84a (see FIG. 8A), an output signal Q-SAMPLE of the second ADC 84b (see FIG. 8A), and an output signal IQ_M of the I-Q demodulator 86 (see FIG. 8A).

Although the following will be described assuming that the period T_CLK of the first clock signal CLK_1 and the second clock signal CLK_2 is the same as (or similar to) the period T of the received ASK signal RS_ASK, the inventive concepts are not limited thereto.

First and second ADCs, in which a maximum (or highest) input value with no saturation of an output value is 1, may be first and second ADCs each having a signal output capability of 1. When a maximum (or highest) input value with no saturation of an output value is 1, it means that when a sine wave having an amplitude of 1 and swinging from 1 to −1 is input to an ADC, an output of the ADC is not saturated, and when a sine wave having an amplitude greater than 1 is input, an output of the ADC is saturated.

The NFC receiver may receive an RF signal through an antenna, and the received ASK signal may be an amplitude-modulated sinusoidal signal RS_ASK. Referring to the timing diagram of the ASK signal RS_ASK having the period of T of FIG. 9, the RF signal received through the antenna may be the ASK signal RS_ASK in which sinusoidal signals having different amplitudes to include different information are periodically repeated.

The first clock signal CLK_1, whose phase is shifted by 45° from a reference clock signal by a clock generator and a phase shifter, may be a clock signal that enables the first ADC to obtain an I-sample value by sampling the received ASK signal at a rising edge.

The second clock signal CLK_2, whose phase is shifted by 135° from the reference clock signal by the clock generator and the phase shifter, may be a clock signal that enables the second ADC to obtain a Q-sample value by sampling the received ASK signal at a rising edge.

In embodiments, magnitudes of the I-sample and the Q-sample may be the same or similar, and when the first clock signal CLK_1 and the second clock signal CLK_2 whose phases are respectively shifted by 45° and 135° from the reference clock signal are used, an extendable ADC input range may be maximized or increased.

The output signal IQ_M of the I-Q demodulator may be expressed as a value, that is, an I-Q magnitude, obtained by adding squares of the I-sample and the Q-sample, and then finding a square root. The same description as (or a similar description to) that made with reference to FIG. 3 will be omitted.

Figure 10:
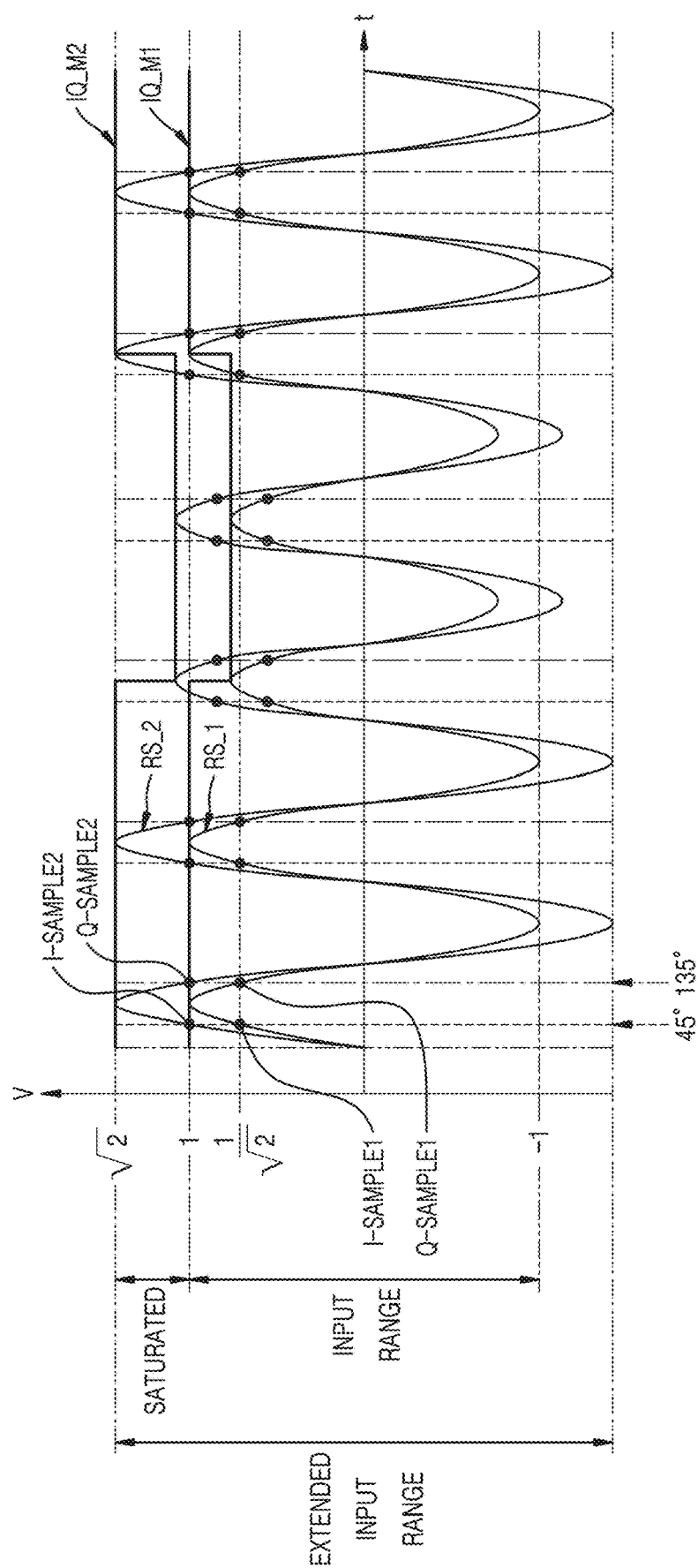
FIG. 10 is a timing diagram illustrating internal signals of an NFC receiver indicating an input range of a first analog-to-digital converter (ADC) and a second ADC included in the NFC receiver of FIG. 8A and an extended input range.

FIG. 10 is a timing diagram illustrating internal signals of an NFC receiver indicating an input range of a first ADC or a second ADC included in the NFC receiver of FIG. 8A, and an extended input range.

FIG. 10 is a timing diagram illustrating a first input signal RS_1 of a first ADC and a second ADC, output signals I-SAMPLE1 and Q-SAMPLE1 corresponding to the first input signal RS_1, a second input signal RS_2 of the first ADC and the second ADC, output signals I-SAMPLE2 and Q-SAMPLE2 corresponding to the second input signal RS_2, a first output signal IQ_M1 of an I-Q demodulator and a second output signal IQ_M2 of the I-Q demodulator.

The first input signal may be a signal having a maximum (or highest) input value within the input range of the first ADC and the second ADC, and the input range may correspond to a specification applied when designing the first ADC and the second ADC. The second input signal is a signal having a maximum (or highest) input value within a substantially extended input range, and the extended input range means that a range of a maximum (or highest) input value with no saturation of an output value of the first ADC and the second ADC is extended by adjusting sampling points of the first ADC and the second ADC when compared to the input range.

Although it is assumed that the first ADC and the second ADC are ADCs having the same specification or similar specifications, and have a maximum (or highest) input value of 1 and a maximum (or highest) output value of 1, the inventive concepts are not limited thereto. The maximum (or highest) input value of the first ADC and the second ADC may be defined as a maximum (or highest) value that may be input without an output value being saturated, and the maximum (or highest) output value may be defined as a maximum (or highest) value that may be normally represented without being saturated.

When a signal having the maximum (or highest) input value as a peak value is input to the first ADC and the second ADC, an I-Q magnitude may be the same as (or similar to) the maximum (or highest) input value. For example, when the first input signal RS_1 having a peak value of 1 is input to the first ADC and the second ADC, values of output signals of the first ADC and the second ADC, that is, the I-sample and the Q-sample, may each be $$\frac{1}{\sqrt{2}}.$$

In this case, the I-Q magnitude may be 1. For example, although the input range of the first ADC and the second ADC is 1, even when the second input signal RS_2 having a peak value of $\sqrt{2}$ is input to the first ADC and the second ADC, values of output signals of the first ADC and the second ADC, that is, the I-sample and the Q-sample, are each 1 corresponding to the maximum (or highest) output value that is not saturated, and thus an output value of the first ADC and the second ADC may not be saturated. In this case, the I-Q magnitude is $\sqrt{2}$.

When an input signal greater than the maximum (or highest) input value is input to the first ADC and the second ADC, according to a sampling point, that is, according to a phase of the first clock signal CLK_1 or the second clock signal CLK_2, the I-sample or the Q-sample having a value greater than the maximum (or highest) input value may be sampled, and in this case, an output value of the ADC may exceed a representable range and may be saturated. However, even when an input signal having a value (which may be referred to as 'second maximum value') greater than the maximum (or highest) input value (which may be referred to as 'first maximum value') is input to the first ADC and the second ADC, as long as the I-sample or the Q-sample is output so that a sampling point has a value less than the maximum (or highest) input value, an output value of the ADC may not be saturated.

According to embodiments, when a signal having a magnitude less than $\sqrt{2}$ that corresponds to $\sqrt{2}$ times the maximum (or highest) input value of 1 is input to the first ADC and the second ADC, because values of the I-sample and the Q-sample are always each less than 1, an output value of the ADC may not be saturated, and even in this case, because the I-Q magnitude may be calculated as $\sqrt{2}$, the same effect as (or a similar effect to) substantially extending an input range of the ADC may be achieved.

The first output signal IQ_M1 of the I-Q demodulator indicates an envelope extracted by the I-Q demodulator by using the I-Q magnitude when the first input signal RS_1 is input to the first ADC and the second ADC, and the second output signal IQ_M2 of the I-Q demodulator indicates an envelope extracted by the I-Q demodulator by using the I-Q magnitude when the second input signal RS_2 is input to the first ADC1 and the second ADC. In the case of an ASK signal, information is included in an amplitude of a carrier wave, and as a magnitude of the carrier wave is amplified, a magnitude for representing the information may also increase at the same rate or a similar rate. The second output signal IQ_M2 of the I-Q demodulator has relatively large values in a magnitude of an amplitude and a difference value of the amplitude, when compared to the first output signal IQ_M1 of the I-Q demodulator. As described above, when an input signal of the ADC exceeds the input range, because an amplitude including actual information may also increase, the reception performance of the NFC receiver may be relatively improved under the assumption that the ADC having the same specification (or similar specifications) is used. According to embodiments, the I-Q demodulator (e.g., the I-Q demodulator 86) may detect the envelope equal to or less than (e.g., having a highest value equal to or less than) the maximum (or highest) input value input to the first ADC and the second ADC.

In embodiments of the inventive concepts, because values of the I-sample and the Q-sample are the same (or similar), the above-described effect may be achieved by using only one ADC based on a first clock signal. However, due to a phase error at a sampling point, this effect may not be achieved by using only one ADS. Accordingly, as described above, the first ADC and the second ADC may be used and a magnitude of an input signal of the first ADC and the second ADC may be appropriately extended to 1 to $\sqrt{2}$ times the maximum (or highest) input value of the first ADC and the second ADC.

Figure 11:
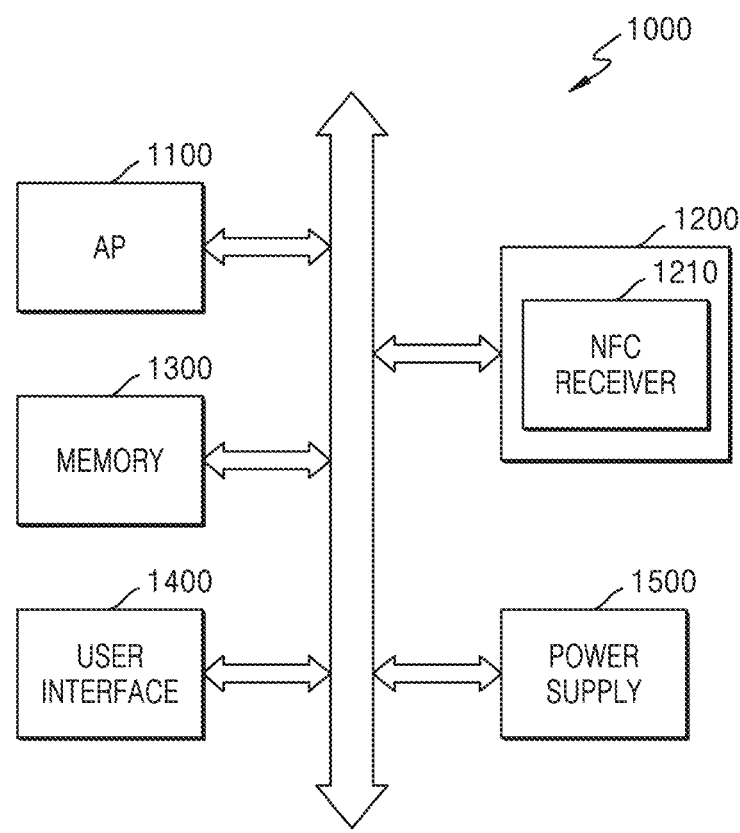
FIG. 11 is a block diagram illustrating an electronic system, according to embodiments of the inventive concepts.

FIG. 11 is a block diagram illustrating an electronic system, according to embodiments of the inventive concepts.

Referring to FIG. 11, an electronic system 1000 may include an application processor (AP) 1100, an NFC device 1200, a memory device 1300, a user interface 1400, and/or a power supply 1500. The electronic system 1000 may be a mobile system such as a mobile phone, a smartphone, a PDA, a PMP, a digital camera, a music player, a portable game console, a navigation system, a laptop computer, etc.

The AP 1100 may control an overall operation of the electronic system 1000. The AP 1100 may execute applications that provide an internet browser, a game, a video, etc. The AP 1100 may include a single processor core, or multi-processor cores.

The memory device 1300 may store data used to operate the electronic system 1000. The memory device 1300 may store, for example, a boot image for booting the electronic system 1000, and may store output data transmitted to an external device and/or input data received from the external device.

The NFC device 1200 may transmit output data stored in the memory device 1300 to the external device, and/or receive input data from the external device, through NFC communication. The NFC device 1200 may store the input data in the memory device 1300. The NFC device 1200 may include an NFC receiver 1210 according to embodiments of the inventive concepts. According to embodiments of the inventive concepts, when an RF signal is received during NFC communication, the electronic system 1000 may stably receive the RF signal having a low SNR, and may increase a reception rate of the RF signal.

Conventional near-field communication (NFC) receivers include an excessive amount of analog circuits (e.g., mixers, variable gain amplifiers (VGAs), capacitors, etc.) that increase the complexity of the design and operation of the conventional NFC receivers. For example, the conventional NFC receivers perform indirect sampling with ADCs which involves synchronizing a frequency of a received amplitude modulation (AM) signal with sampling clock signals for the ADCs. The excessive amount of analog circuits are used to implement this indirect sampling approach. Accordingly, the conventional NFC receivers are excessively costly to manufacture and experience excessive operational errors due to their high complexity. Also, the conventional NFC receivers attenuate received AM signals having a peak outside of an input range of the ADCs. Accordingly, the conventional NFC receivers experience excessive amounts of information reception errors due to the reduction in the quality of the AM signal caused by the attenuation.

However, embodiments provide improved NFC receivers including fewer analog circuits, and thus, involving a simpler design and operation. For example, the improved NFC receivers may perform direct sampling with the ADCs that does not include synchronizing the frequency of the received AM signal with the sampling clock signals for the ADCs. Accordingly, the improved NFC receivers may be manufactured with fewer analog circuits. Thus, the improved NFC receivers overcome the deficiencies of the conventional NFC receivers to reduce manufacturing costs and/or operational errors.

Also, the improved NFC receivers may perform the direct sampling according to sampling clock signals having phase differences of 45° and 135° from a reference clock signal. Accordingly, the improved NFC receivers are able to receive AM signals having a peak outside of an input range of the ADCs without attenuating the AM signals. Thus, the improved NFC receivers overcome the deficiencies of the conventional NFC receivers to improve the quality of the AM signal and reduce information reception errors.

According to embodiments, operations described herein as being performed by the NFC system 1, the NFC circuit 10, the NFC tag 20, the NFC receiver 30, the first ADC 32, the second ADC 34, the I-Q demodulator 36, the NFC modem 38, the clock generator 31a, the phase shifter 31b, the first LPF 35a, the second LPF 35b, the NFC receiver 60, the anti-aliasing filter 61, the LNA 62, the clock generator 63a, the phase shifter 63b, the first ADC 64a, the second ADC 64b, the first LPF 65a, the second LPF 65b, the NFC modem 69, the I-Q demodulator 66, the DC remover 67, the gain controller 68, the NFC receiver 70, the clock generator 73, the phase shifter 74, the first ADC 75a, the second ADC 75b, the NFC receiver 80, the clock generator 82, the phase shifter 83, the first ADC 84a, the second ADC 84b, the first LPF 85a, the second LPF 85b, the I-Q demodulator 86, the NFC modem 87, the electronic system 1000, the AP 1100, the NFC device 1200 and/or the NFC receiver 1210 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

It will be understood that when an element is referred to as being "connected" or "coupled" to another element, it may be directly connected or coupled to the other element or intervening elements may be present. As used herein the term "and/or" includes any and all combinations of one or more of the associated listed items.

While the inventive concepts have been particularly shown and described with reference to embodiments thereof, it will be understood that various changes in form and details may be made therein without departing from the spirit and scope of the following claims.

What is claimed is:

1. A near-field communication (NFC) receiver comprising:
   at least one antenna configured to receive an amplitude modulation (AM) signal;
   a first analog-to-digital converter (ADC) configured to generate an in-phase (I)-sample by sampling the AM signal based on a first clock signal;
   a second ADC configured to generate a quadrature-phase (Q)-sample by sampling the AM signal based on a second clock signal, the second clock signal having a phase difference of 90° from the first clock signal; and
   processing circuitry configured to,
      calculate a root-sum-square (RSS) value between the I-sample and the Q-sample, and
      detect an envelope of the AM signal by using the RSS value.

2. The NFC receiver of claim 1, wherein
   the processing circuitry is configured to,
      generate the first clock signal,
      output the first clock signal to the first ADC,
      shift a phase of the first clock signal by 90°, and
      output the second clock signal to the second ADC;
   a frequency of the AM signal is greater than a Nyquist frequency of the first clock signal; and
   the phase of the first clock signal is not determined based on a phase of the AM signal.

3. The NFC receiver of claim 1, wherein the RSS value is constant regardless of a phase of the first clock signal.

4. The NFC receiver of claim 1, wherein the processing circuitry is configured to:
   generate a digital representation of the envelope; and
   output an output signal comprising the digital representation.

5. The NFC receiver of claim 4, further comprising:
   a low-pass filter configured to remove noise included in the I-sample and the Q-sample,
   wherein the processing circuitry is configured to,
      remove a direct current component of the output signal; and
      control a gain of the output signal.

6. The NFC receiver of claim 1, wherein the processing circuitry is configured to extract information included in an amplitude of the AM signal from the envelope according to an NFC protocol.

7. A near-field communication (NFC) receiver comprising:
   a first analog-to-digital converter (ADC);
   a second ADC, each of the first ADC and the second ADC having a signal output capability of a first maximum value; and
   processing circuitry configured to,
      receive an amplitude modulation (AM) signal having a second maximum value greater than the first maximum value, and
      detect an envelope equal to or less than the first maximum value from the AM signal by using the first ADC and the second ADC,
   wherein,
      the first ADC is configured to sample the AM signal based on a first clock signal, the first clock signal being shifted from a reference clock signal by a first phase, and
      the second ADC is configured to sample the AM signal based on a second clock signal, the second clock signal being shifted from the reference clock signal by a second phase.

8. The NFC receiver of claim 7, wherein the first phase is 45° and the second phase is 135°.

9. The NFC receiver of claim 8, wherein
   the first ADC is configured to output an in-phase (I)-sample, and the second ADC is configured to output a quadrature-phase (Q)-sample; and
   wherein each of the I-sample and the Q-sample has a value corresponding to $$\frac{1}{\sqrt{2}}$$

times a peak value of the AM signal.

10. The NFC receiver of claim 9, wherein
   an output value of the first ADC is saturated when the value of the I-sample exceeds the first maximum value; and
   an output value of the second ADC is saturated when the value of the Q-sample exceeds the first maximum value.

11. The NFC receiver of claim 9, wherein the processing circuitry is configured to:
   calculate an I-Q magnitude by,
      adding squares of the I-sample and the Q-sample to obtain a first result, and
      calculating a square root of the first result; and
   detect the envelope from the AM signal based on the I-Q magnitude.

12. The NFC receiver of claim 11, wherein the processing circuitry is configured to extract information included in an amplitude of the AM signal from the envelope according to an NFC protocol.

13. The NFC receiver of claim 7, further comprising:
   an antenna configured to receive the AM signal,
   wherein the first ADC and the second ADC are directly connected to the antenna.

14. The NFC receiver of claim 7, wherein
the processing circuitry is configured to,
   generate the reference clock signal,
   generate the first clock signal by shifting a phase of the reference clock signal by the first phase, and
   generate the second clock signal by shifting the phase of the reference clock signal by the second phase; and
wherein a frequency of the reference clock signal is the same as a frequency of the AM signal, and the phase of the reference clock signal is the same as a phase of the AM signal.

15. A near-field communication (NFC) receiver comprising:
   an antenna configured to receive an amplitude modulation (AM) signal;
   processing circuitry configured to generate a first clock signal and a second clock signal based on a reference clock signal, the first clock signal and the second clock signal having a phase difference of 90°; and
   a first analog-to-digital converter (ADC) and a second ADC configured to generate two quadrature phase samples of the AM signal by directly sampling the AM signal according to the first clock signal and the second clock signal,
   wherein the processing circuitry is configured to calculate a magnitude value of the two quadrature phase samples.

16. The NFC receiver of claim 15, wherein the first ADC and the second ADC are configured to perform direct sampling by using an undersampling method, and the first ADC and the second ADC are directly connected to the antenna.

17. The NFC receiver of claim 15, wherein the processing circuitry is configured to:
   remove a frequency component higher than a Nyquist frequency for the first clock signal;
   remove noise included in the AM signal; and
   amplify the AM signal.

18. The NFC receiver of claim 15, wherein
the processing circuitry is configured to calculate the magnitude value of the two quadrature phase samples by taking a square root of a sum of squares of the two quadrature phase samples; and
the magnitude value of the two quadrature phase samples is constant regardless of a phase of the first clock signal.

19. The NFC receiver of claim 15, wherein the processing circuitry is configured to:
   generate a digital representation of an envelope; and
   output an output signal comprising the digital representation.

20. The NFC receiver of claim 19, wherein the processing circuitry is configured to extract information included in an amplitude of the AM signal from the envelope according to an NFC protocol.

* * * * *